(12) United States Patent  
Haley

(10) Patent No.: US 8,398,143 B1
(45) Date of Patent: Mar. 19, 2013

(54) MULTI-CONFIGURED DOUBLE STROLLER APPARATUS AND METHOD OF USING SAME

(76) Inventor: Randal B Haley, Bryant, AR (US)

( * ) Notice: Subject to any disclaimer, the term of this patent is extended or adjusted under 35 U.S.C. 154(b) by 381 days.

(21) Appl. No.: 12/763,047

(22) Filed: Apr. 19, 2010

(51) Int. Cl.
B60N 2/14 (2006.01)
B60N 2/24 (2006.01)

(52) U.S. Cl. .............. 296/65.06; 296/65.07; 297/344.21

(58) Field of Classification Search ............... 296/65.06, 296/65.07, 64; 297/344.21–344.25; 280/647, 280/648, 650, 47.8, 47.39, 47.41, 657, 658, 280/47.38, 47.4
See application file for complete search history.

(56) References Cited

U.S. PATENT DOCUMENTS

| | | | | |
|---|---|---|---|---|
| 1,937,578 A * | 12/1933 | Knight | ........................... | 297/329 |
| 2,716,438 A * | 8/1955 | Furst | ........................... | 297/344.1 |
| 3,223,431 A * | 12/1965 | Gottfried et al. | ........... | 280/47.38 |
| 3,394,964 A * | 7/1968 | Humphries et al. | .......... | 297/240 |
| 3,997,180 A * | 12/1976 | Okubo | ........................... | 280/31 |
| 5,630,638 A * | 5/1997 | Hirasawa et al. | ......... | 296/65.07 |
| 6,302,483 B1 * | 10/2001 | Ricaud et al. | ............ | 297/344.24 |
| 6,332,648 B1 * | 12/2001 | Aucheron | ............... | 297/344.24 |
| 6,402,114 B1 * | 6/2002 | Carnahan et al. | ............ | 248/425 |
| 6,935,652 B2 * | 8/2005 | Fair et al. | ....................... | 280/642 |
| 6,962,383 B2 * | 11/2005 | Takenoshita et al. | ...... | 296/65.03 |
| 6,991,060 B2 * | 1/2006 | Chernoff et al. | .............. | 180/326 |
| 7,364,183 B2 * | 4/2008 | Lee | ................................ | 280/642 |
| 7,399,035 B2 * | 7/2008 | Kusanagi et al. | ......... | 297/344.24 |
| 7,828,383 B1 * | 11/2010 | Urbanek et al. | ........... | 297/344.1 |
| 7,850,242 B2 * | 12/2010 | Taguchi et al. | .......... | 297/344.24 |
| 8,033,589 B2 * | 10/2011 | Kusanagi et al. | ............ | 296/68.1 |
| 8,033,605 B2 * | 10/2011 | Miura et al. | ............. | 297/344.14 |
| 8,056,980 B2 * | 11/2011 | Koutsky et al. | ........... | 297/344.21 |
| 8,136,831 B1 * | 3/2012 | Caruso | .......................... | 280/642 |
| 8,157,273 B2 * | 4/2012 | Bar-Lev | ..................... | 280/47.39 |
| 8,182,016 B2 * | 5/2012 | Kaip et al. | ................. | 296/65.06 |
| 2009/0302578 A1 * | 12/2009 | White et al. | .................. | 280/642 |

* cited by examiner

Primary Examiner — Glenn Dayoan
Assistant Examiner — Gregory Blankenship
(74) Attorney, Agent, or Firm — Joe D. Calhoun; Rashauna A. Norment

(57) ABSTRACT

The invention is an apparatus and method of using same for controlling the positioning of one or more of the seats for a vehicle, such as a double stroller, with an actuating mechanism beneath the seat that controls the seating arrangement from a tandem arrangement to a lateral arrangement and vice versa, in addition to the seat's pivoting, sliding and revolving. The apparatus comprises a frame anchored to the stroller, the frame having a plurality of stop members and supporting a ring carriage; a ring revolvably captured within the ring carriage; and an actuating mechanism beneath the seat, the mechanism comprising: a handle and a support housing for supporting the mechanism over the ring, for housing a sliding means for sliding the seat, and for supporting a revolving means for revolving the seat, along with the ring, around the frame and a pivoting means for pivoting the seat.

19 Claims, 29 Drawing Sheets

MULTI-CONFIGURED DOUBLE STROLLER APPARATUS AND METHOD OF USING SAME

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

The present invention generally relates to an apparatus for controlling the positioning of one or more of the seats for a vehicle, such as a double stroller, with an actuating mechanism beneath the seat. The mechanism controls not only the seating arrangement from a tandem arrangement to a lateral arrangement and vice versa, but also the seat's pivoting, sliding and revolving.

Transporting a child in a stroller is a convenience that may become complicated when more than one child needs to be transported. Several options are available for transporting more than one child, including, but not limited to, double strollers with the seats in tandem, double strollers with the seats side-by-side or lateral, two single strollers with their frames interlocked together to form an ad hoc double stroller, and multi-seat strollers. Although these options may be beneficial to some users, disadvantages still exist. For example, a lateral double stroller may be prohibited from entering or passing through certain spaces, such as standard entryways or narrow shopping aisles, without the need to unload the children and to collapse the stroller. In a tandem double stroller, the viewpoint of the child sitting in the rear seat may be limited. Some attempts to provide more flexibility in seating arrangements include devices which clamp or interlock two single stroller frames together; however, such devices may be complicated, time-consuming, and/or require use of various tools for assembly. Therefore, it would be advantageous and convenient to be able to readily and easily convert the seating arrangement between tandem and lateral arrangements, as well as to adjust the seat's pivoting, sliding and revolving to create a customized configuration.

Furthermore, a need exists for an apparatus for controlling the positioning of one or more of the seats for a vehicle, specifically a double stroller, by using an actuating mechanism having a single handle for controlling the seat's pivoting, sliding and revolving, and for controlling the seating arrangement from a tandem arrangement to a lateral arrangement and vice versa.

(2) Description of Related Art Including Information Disclosed 37 CFR 1.97 and 1.98.

The following patents are arguably material to the patentability of the invention disclosed herein:

| Patent/App. # | 1st Inventor | Date of Issue/Publication |
| --- | --- | --- |
| 4,805,938 | Redmond et al. | Feb. 21, 1989 |
| 5,522,121 | Fraynd et al. | Jun. 4, 1996 |
| 5,918,892 | Aaron et al. | Jul. 6, 1999 |
| 6,527,294 B1 | Brewington et al. | Mar. 4, 2003 |
| 6,863,297 | Shapiro | Mar. 8, 2005 |
| 2008/0179863 A1 | Schonfeld | Jul. 31, 2008 |

U.S. Pat. No. 4,805,938 issued to Redmond et al. discloses a device for connecting the frames of two single strollers together. It discloses a pair of spaced apart bracket units that clamp the two stroller frames together so that one person can operate the strollers simultaneously when transporting two occupants. Each housing segment has a central inwardly extending recess from the mating edge in which a bolt passes therethrough. It also discloses a spring disposed onto a bolt between the recesses so that the segments will separate when a wing nut is loosened on the bolt. It discloses a modified bracket unit having a housing segment that includes a stationary middle member having a side square shaped hole at each end and a pair of moving members. It further discloses that each moving member has a side square shaped shaft to slidably fit into the respective side square shaped hole.

U.S. Pat. No. 5,522,121 issued to Fraynd et al. discloses a device for engaging any two stroller devices using two spaced apart components coupled with a snap release connector. The device has a male section and a female section, with the female section allowing for a snap release action of the parts when a connector cover is pulled. The connector cover uses a front to back snapping motion, while a disc serves as the stopper motion. Pulling the connector cover releases connecting teeth to create a separation in the two components of the device.

U.S. Pat. No. 6,863,297 issued to Shapiro discloses a stroller with wheels having pivoting wheel support units. A front wheel fork may be released by a user pressing a spring-biased release button, after which a user may pivot the forward wheel in its same plane, down and away from its operative position in one axis.

None of the aforementioned discloses an apparatus for controlling the positioning of one or more of the seats for vehicle, specifically a double stroller, the apparatus comprising an actuating mechanism with a single handle for controlling the seat's pivoting, sliding and revolving, and for controlling the seating arrangement from a tandem arrangement to a lateral arrangement and vice versa.

BRIEF SUMMARY OF THE INVENTION

Although the present invention has several embodiments, the version described is an apparatus for controlling the positioning of one or more of the seats for a vehicle. The apparatus comprises (includes) a frame anchored to the vehicle, with the frame having a plurality of stop members and supporting a ring carriage; a ring revolvably captured within the ring carriage; and an actuating mechanism (the "mechanism") beneath the seat. The mechanism comprises a handle; and a support housing for supporting the mechanism on the ring, for housing a sliding means for sliding the seat outwardly and inwardly, and for supporting a revolving means for revolving the seat, along with the ring, around the frame and a pivoting means comprising a pivot point for pivoting the seat.

The seat is capable of pivoting 360° clockwise or counter-clockwise on a pivot point, sliding outwardly and inwardly, and revolving around the frame. The seat may also be removed from the frame. Each seat requires its own mechanism for movement; all movements are initiated by pulling the mechanism's handle.

One primary object of the present invention is to provide an apparatus for controlling the positioning of one or more of the seats for a vehicle, wherein the apparatus comprises an actuating mechanism with a single handle for controlling the seating arrangement from a tandem arrangement to a lateral arrangement and vice versa.

Another primary object of the present invention is to provide an apparatus for controlling the positioning of one or more of the seats for a double stroller, wherein the apparatus comprises an actuating mechanism for controlling and converting more than one seat from a tandem arrangement to a lateral arrangement and vice versa.

Another primary object of the present invention is to provide an apparatus for controlling the seat's pivoting, sliding and revolving.

Yet another object of the present invention is to provide an apparatus for controlling multiple seating configurations.

Yet another object of the invention is to provide a double stroller having an apparatus capable of attaining multiple seating configurations.

Another object of the invention is to provide a double stroller having an apparatus capable of easily converting from one seat to more than one seat and vice versa, and for transporting one or more occupants.

Other objects will be apparent from a reading of the written description disclosed herein, together with the claims.

Figure 1:
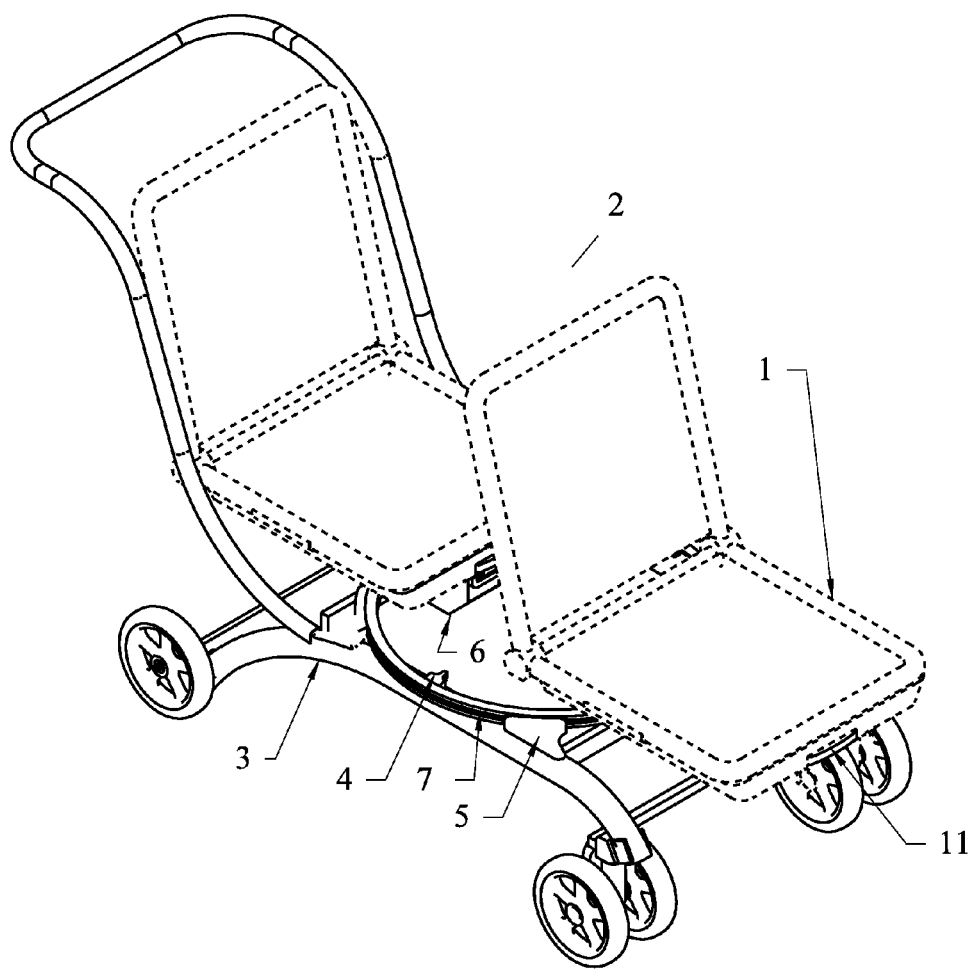
FIG. 1 depicts a perspective view of the invention, with the seats in a forward facing, tandem arrangement.
Figure 2:
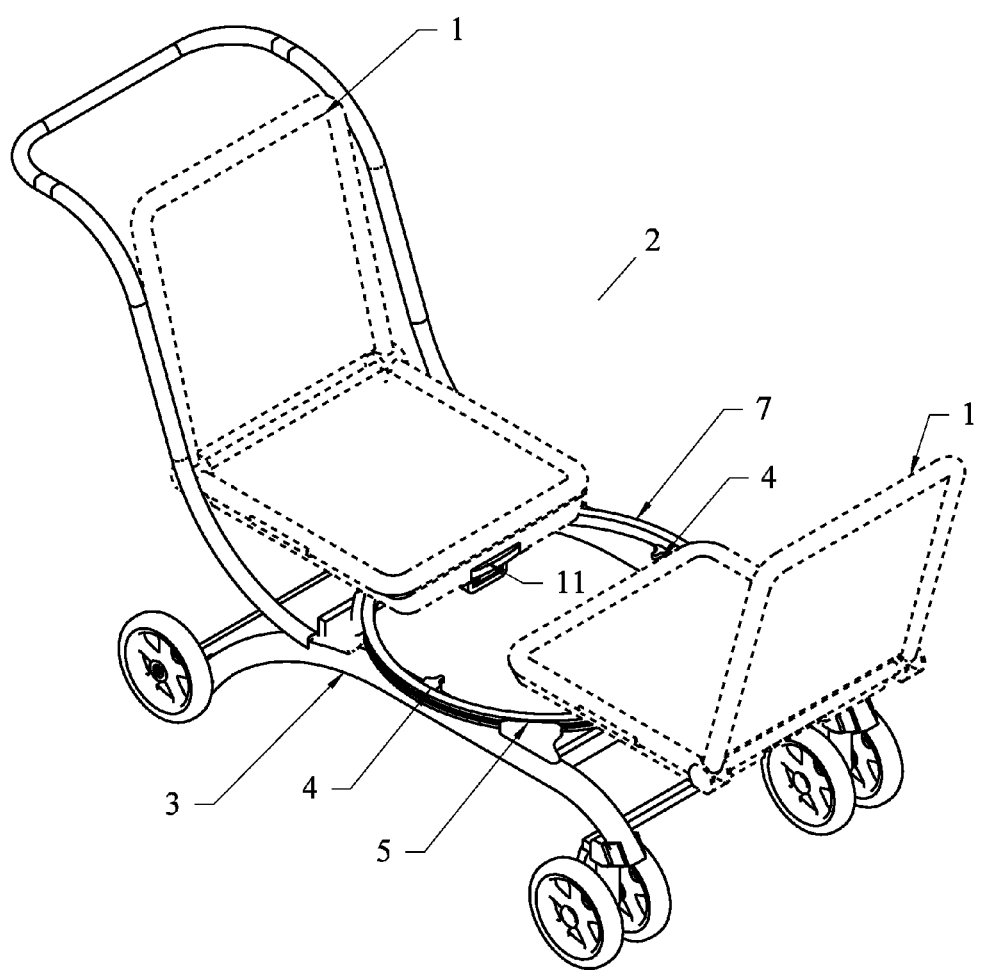
FIG. 2 depicts a perspective view, with the seats in an inward facing, tandem arrangement.
Figure 3:
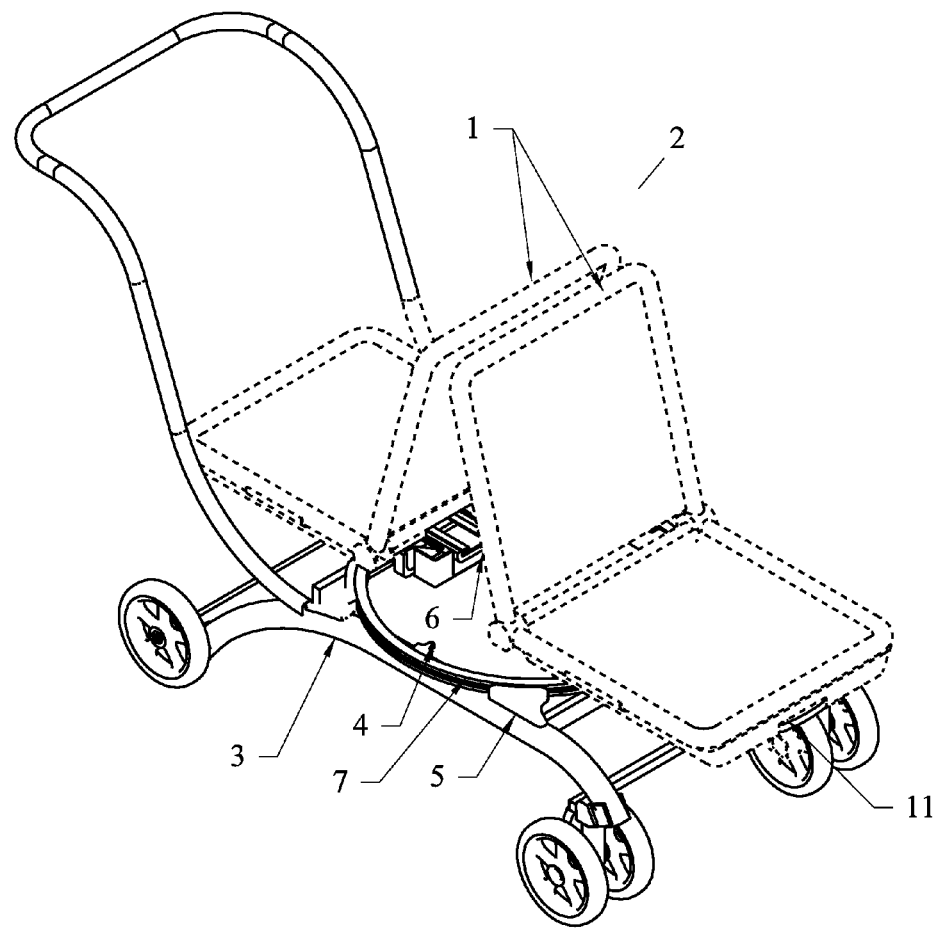
FIG. 3 depicts a perspective view, with the seats in an outward facing, tandem arrangement.
Figure 4:
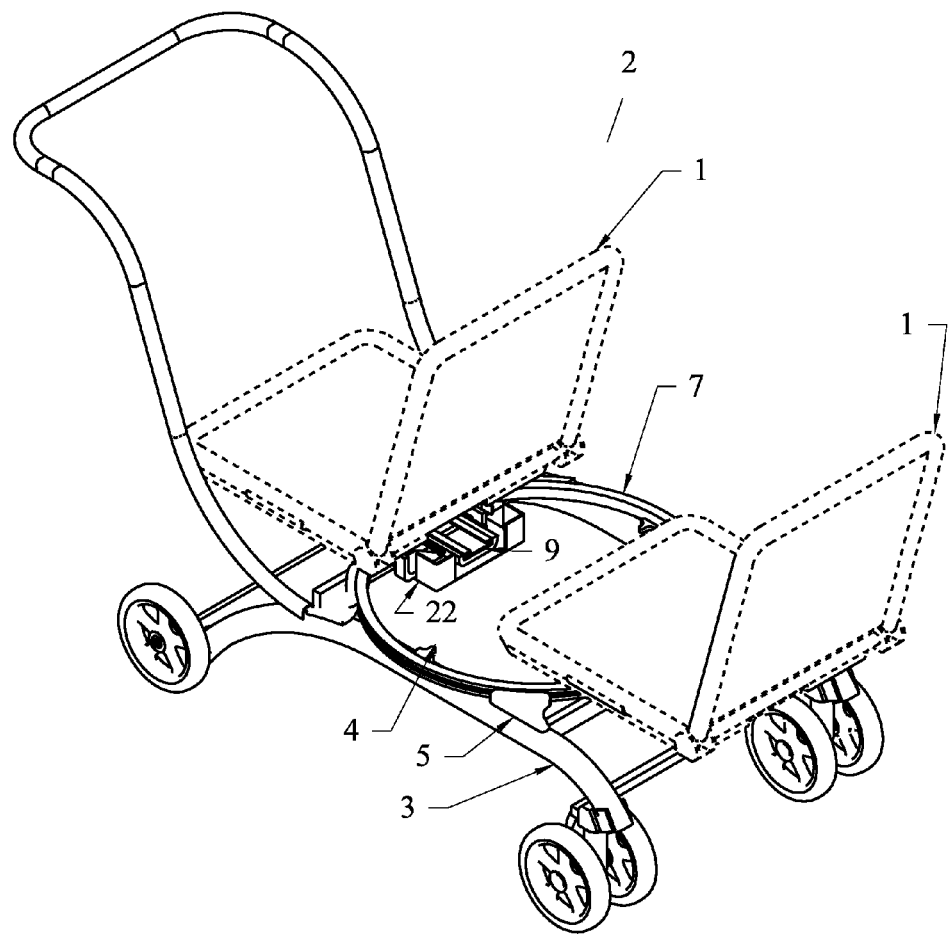
FIG. 4 depicts a perspective view, with the seats in a rearward facing, tandem arrangement.
Figure 5:
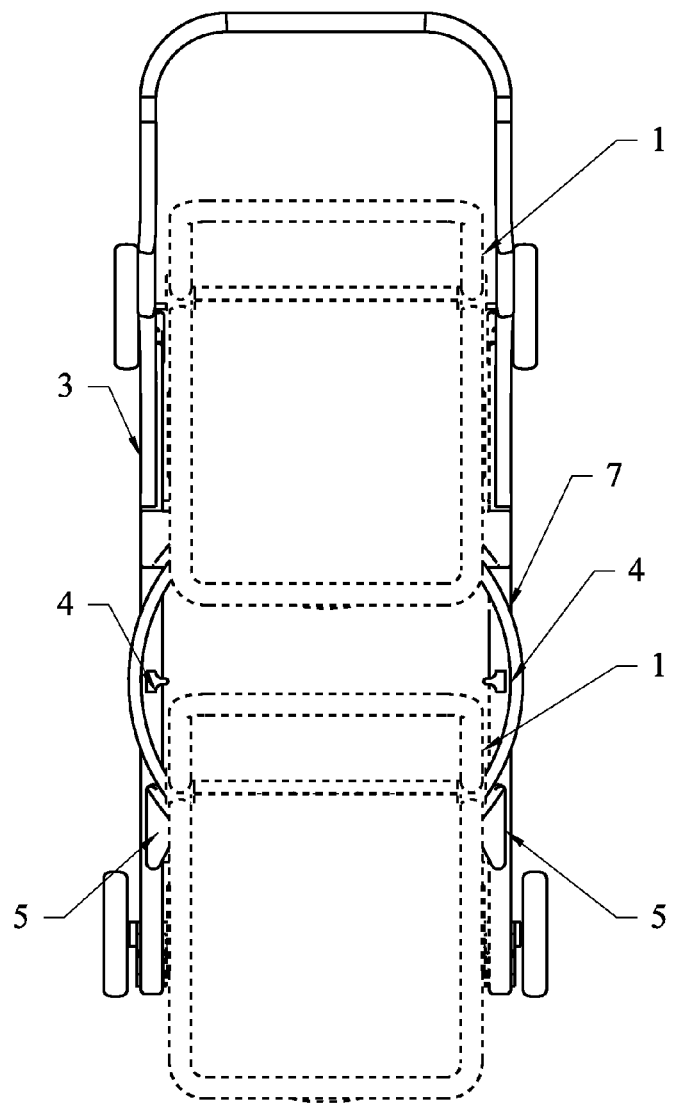
FIG. 5 depicts a top plan view of FIG. 1.
Figure 6:
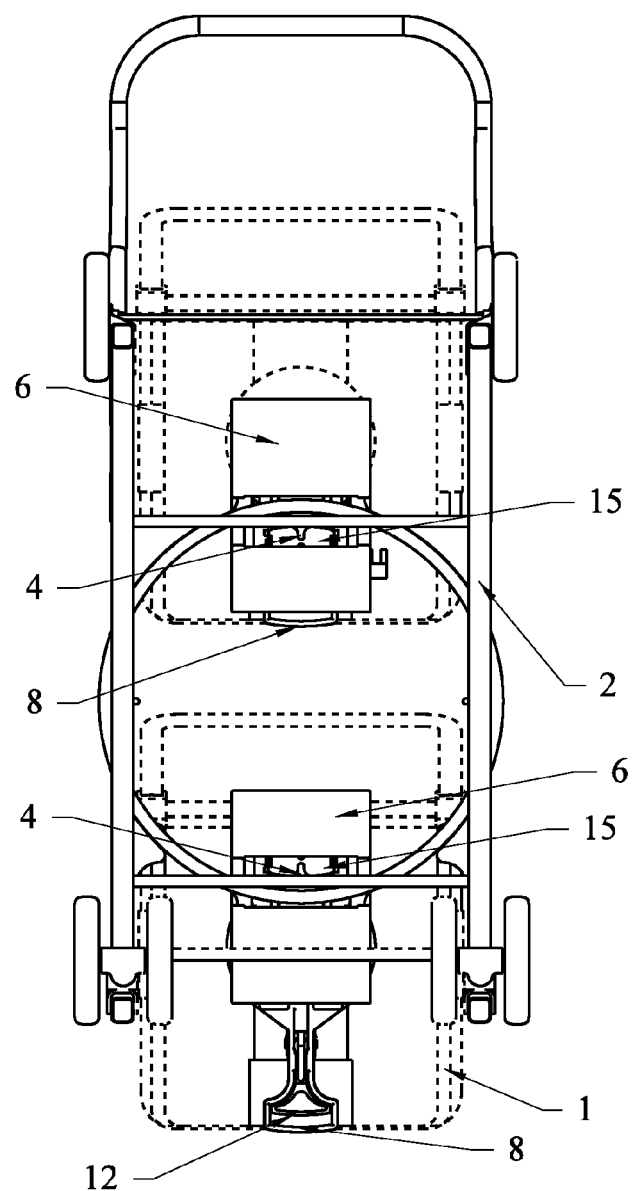
FIG. 6 depicts a bottom plan view of FIG. 1.
Figure 7:
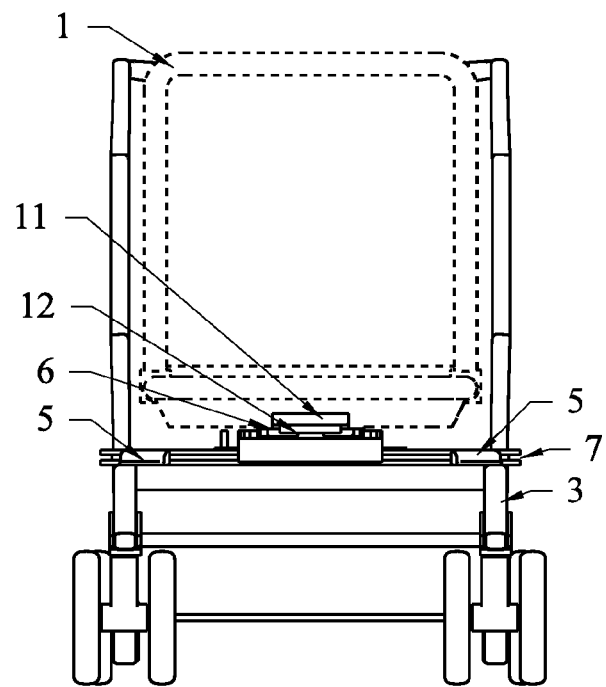
FIG. 7 depicts a front elevation of FIG. 1.
Figure 8:
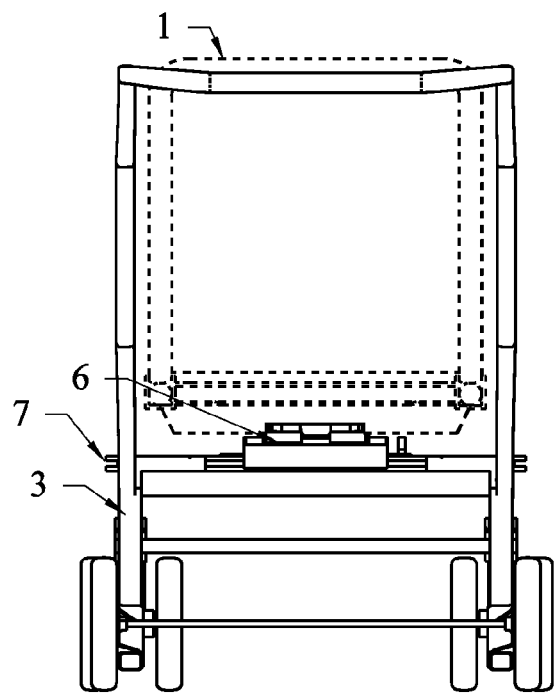
FIG. 8 depicts a rear elevation of FIG. 1.
Figure 10:
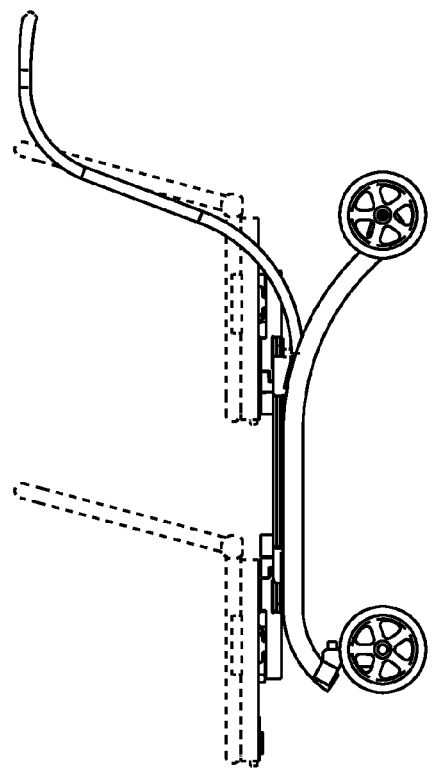
FIG. 10 depicts a left side elevation of FIG. 1.
Figure 9:
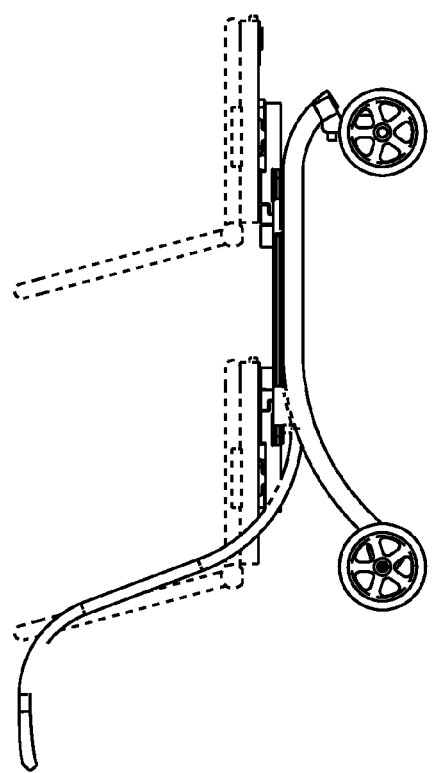
FIG. 9 depicts a right side elevation of FIG. 1.
Figure 11:
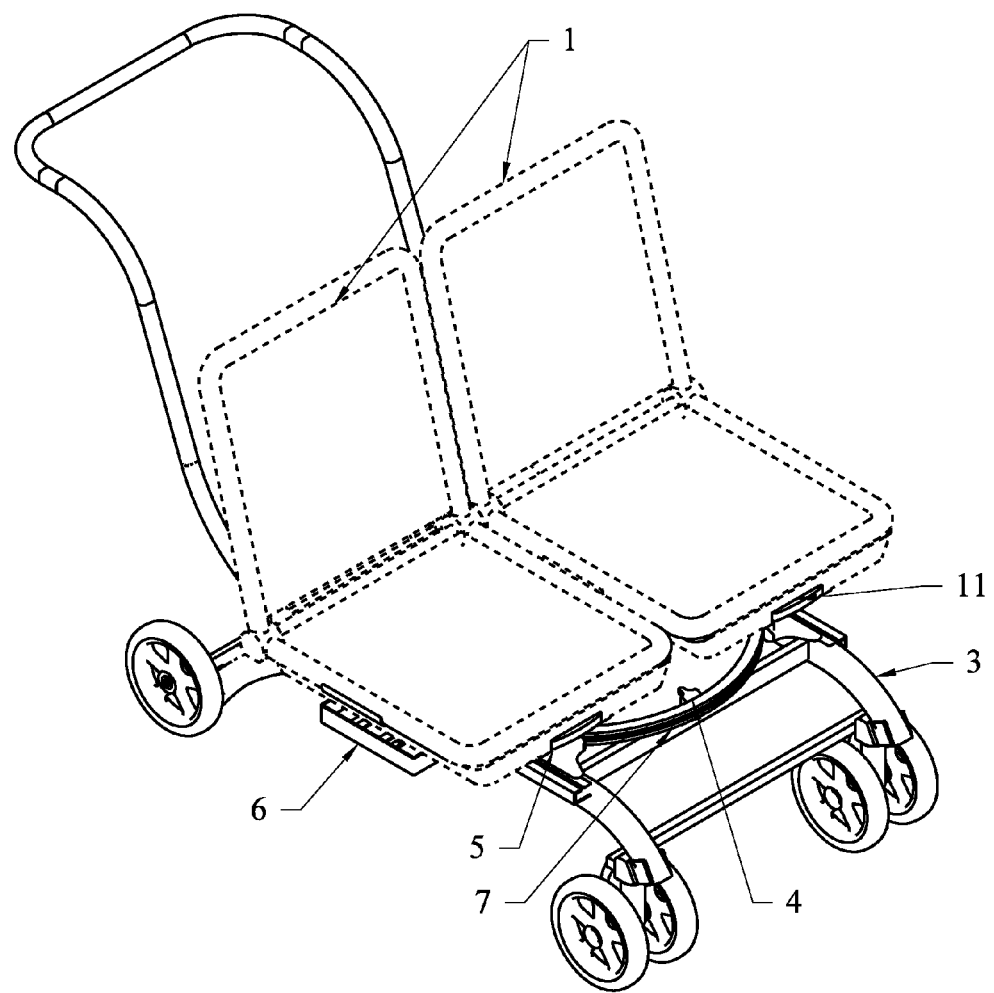
FIG. 11 depicts a perspective view of another embodiment of the invention, with the seats in a forward facing, lateral arrangement.
Figure 12:
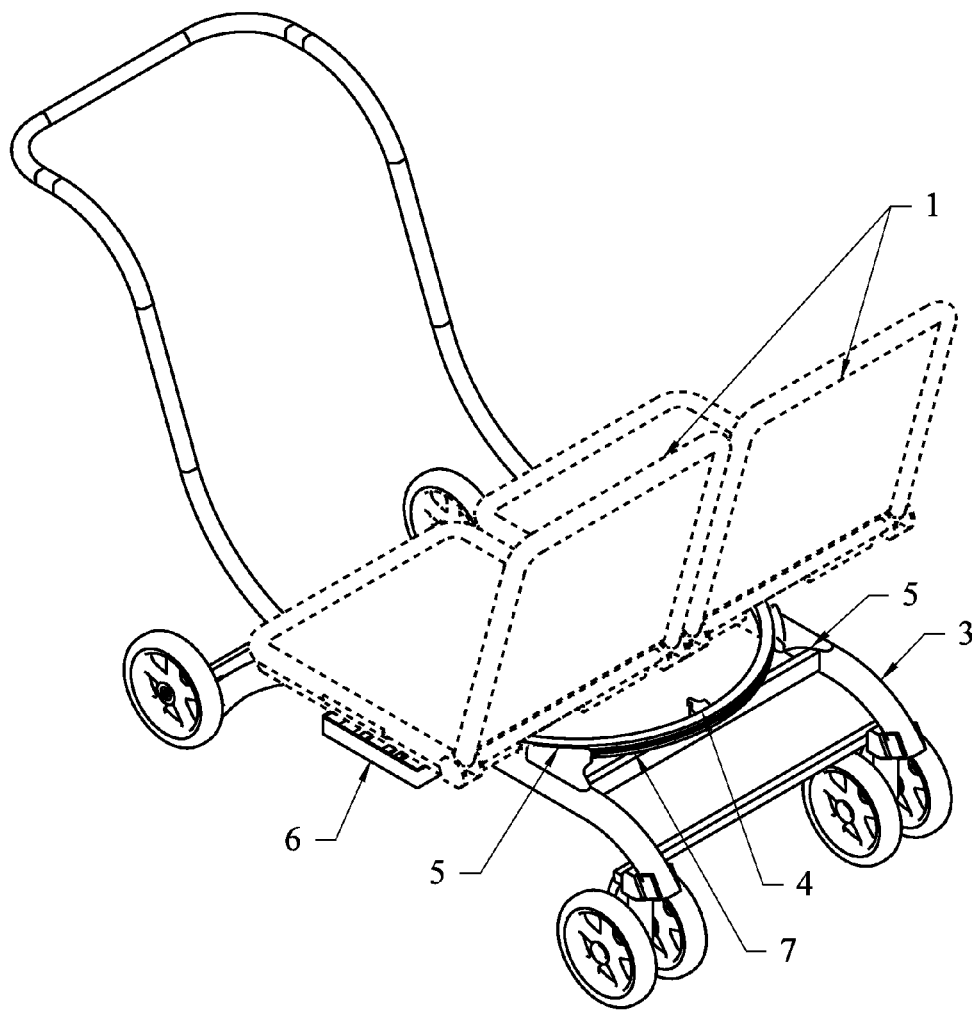
FIG. 12 depicts a perspective view, with the seats in a rearward facing, lateral arrangement.
Figure 13:
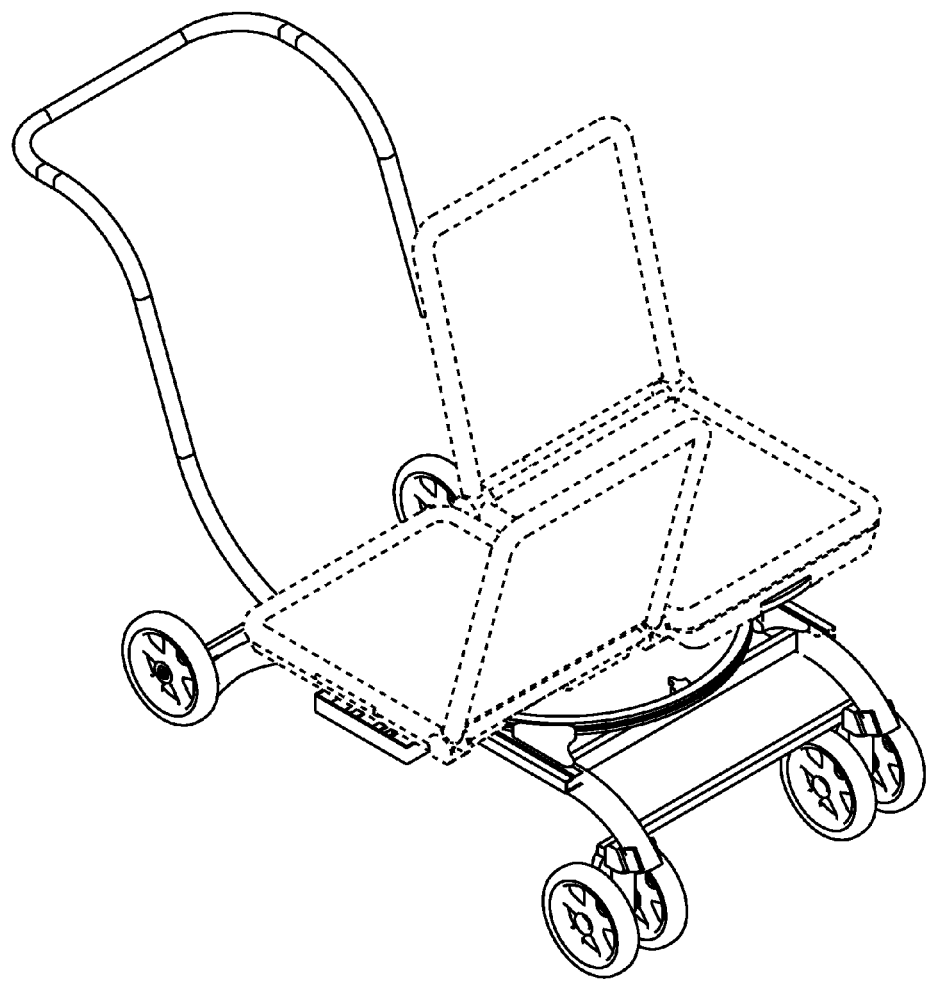
FIG. 13 depicts a perspective view of a lateral arrangement, with a first seat forward facing and a second seat rearward facing.
Figure 14:
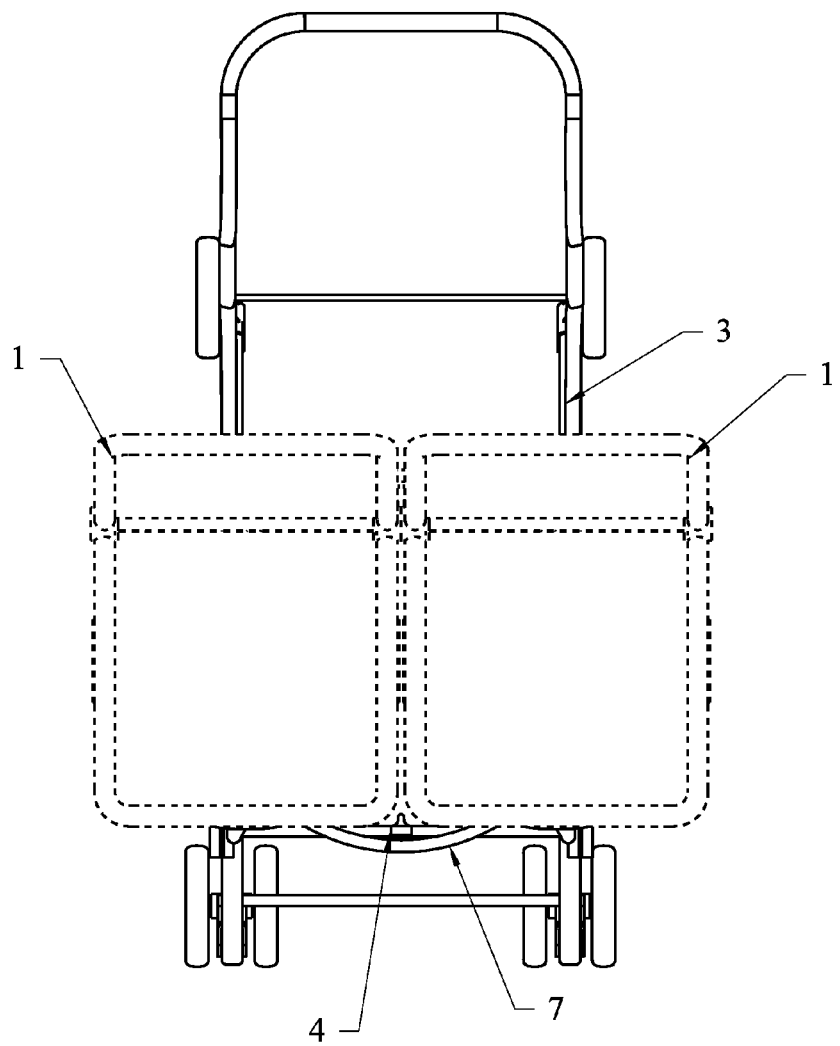
FIG. 14 depicts a top plan view of FIG. 11.
Figure 15:
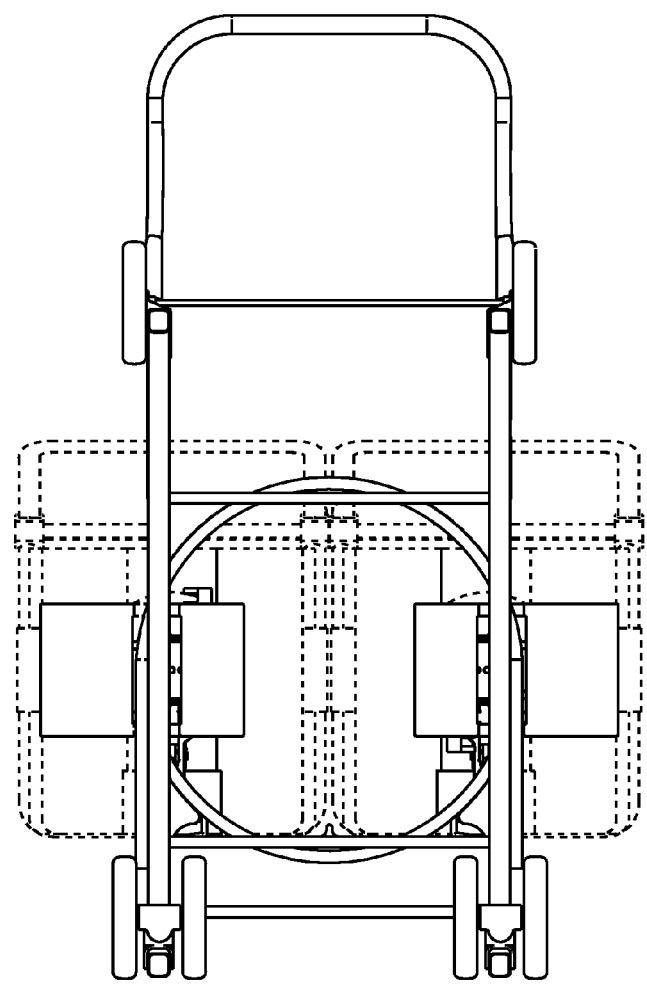
FIG. 15 depicts a bottom plan view of FIG. 11.
Figure 16:
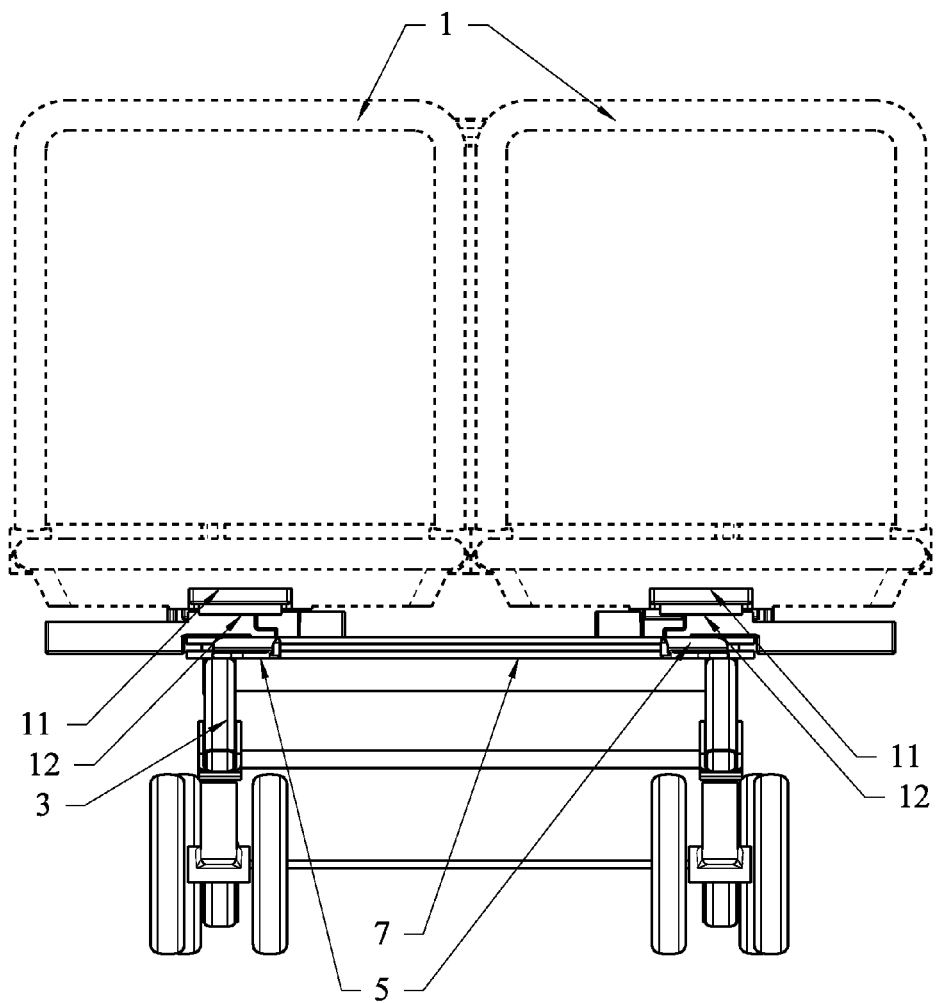
FIG. 16 depicts a front elevation of FIG. 11.
Figure 17:
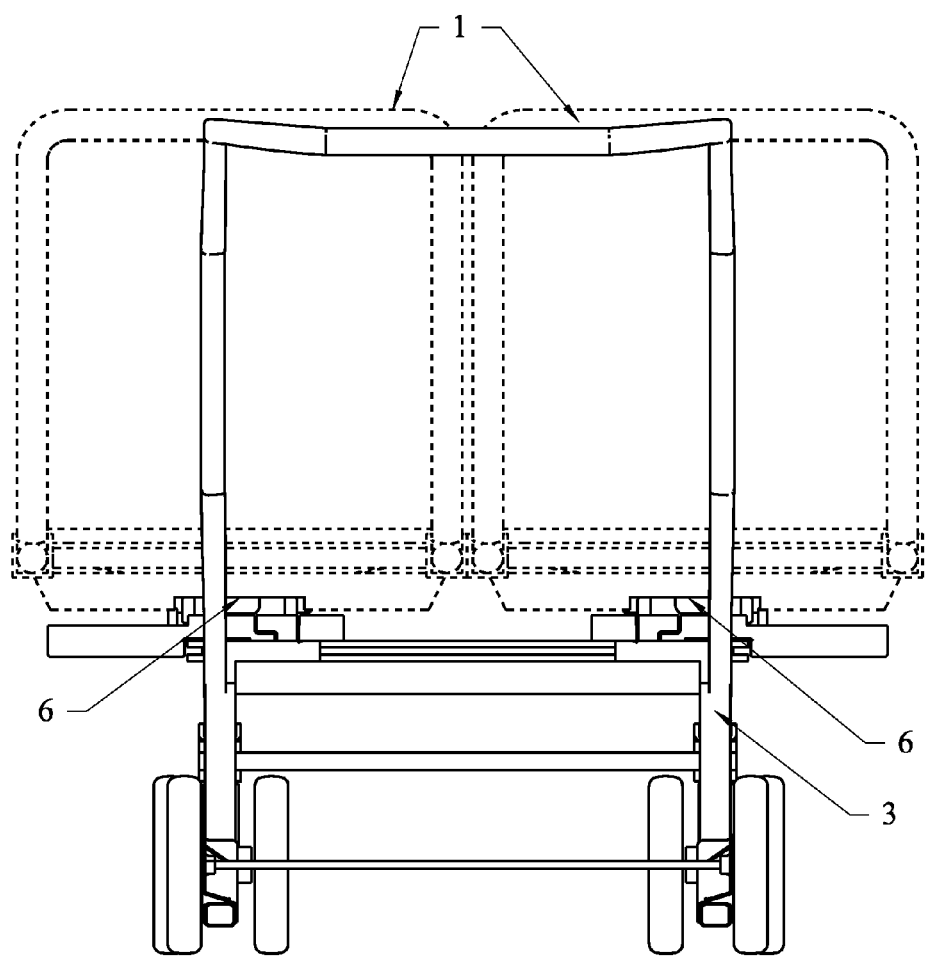
FIG. 17 depicts a rear elevation of FIG. 11.
Figure 19:
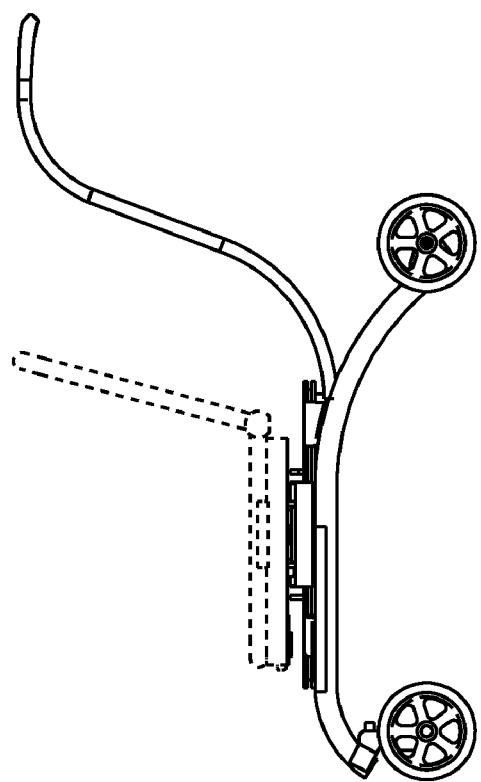
FIG. 19 depicts a left side elevation of FIG. 11.
Figure 18:
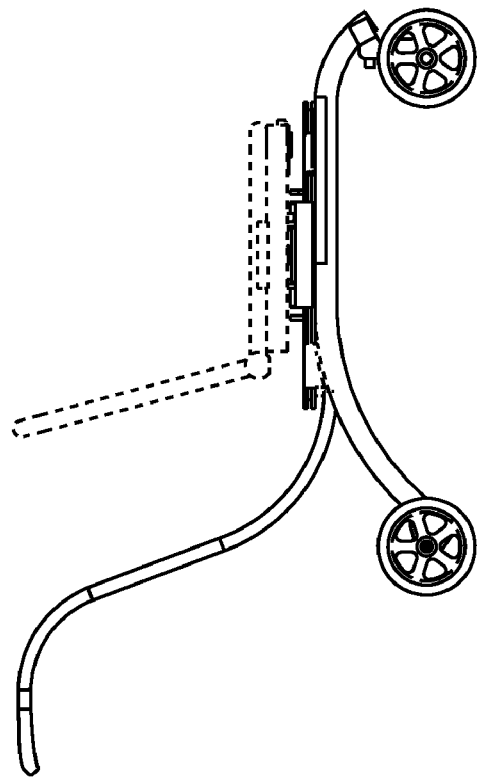
FIG. 18 depicts a right side elevation of FIG. 11.
Figure 20:
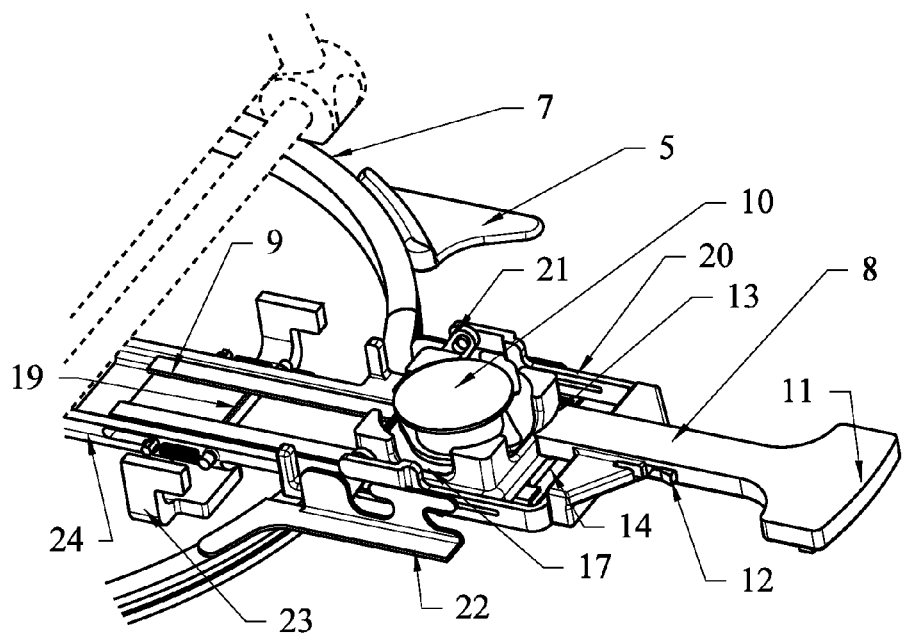
FIG. 20 depicts a top perspective view of the actuating mechanism in an unlocked position.
Figure 21:
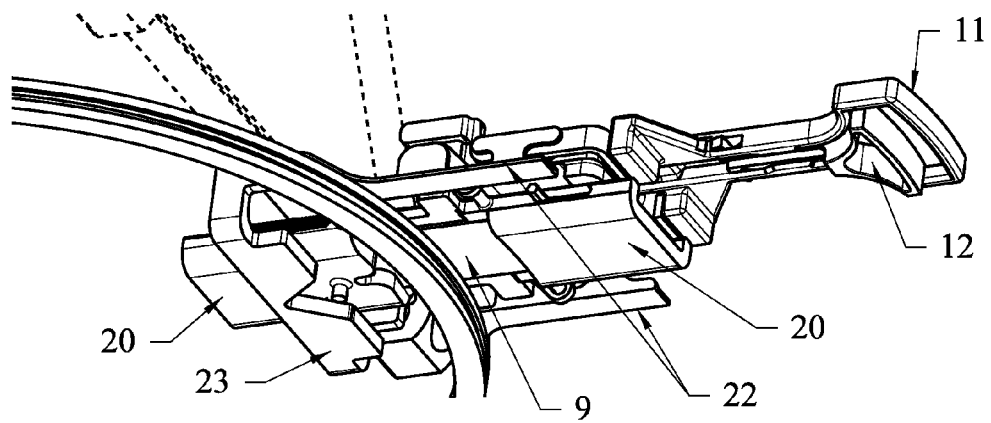
FIG. 21 depicts a bottom perspective view of FIG. 20.
Figure 22:
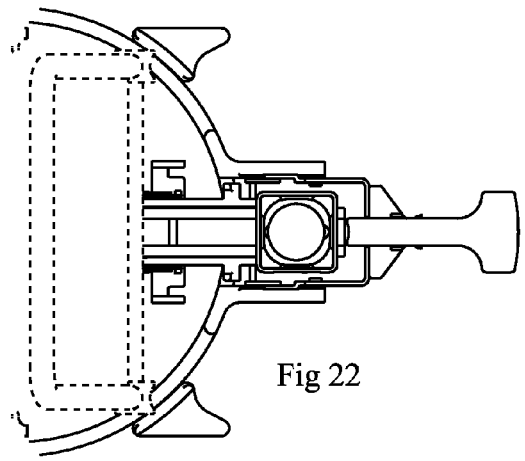
FIG. 22 depicts a top plan view of FIG. 20.
Figure 23:
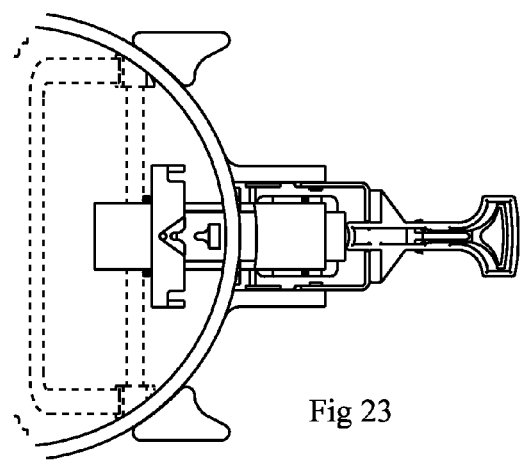
FIG. 23 depicts a bottom plan view of FIG. 20.
Figure 24:
FIG. 24 depicts a right side elevation of FIG. 20.
Figure 25:
FIG. 25 depicts a left side elevation of FIG. 20.
Figure 26:
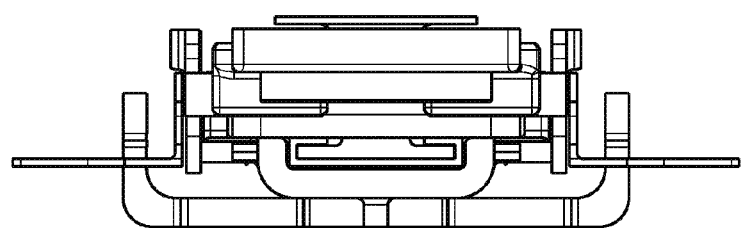
FIG. 26 depicts a front elevation of FIG. 20, wherein the mechanism in a locked position is a mirror image of FIG. 26, and therefore is not depicted.
Figure 27:
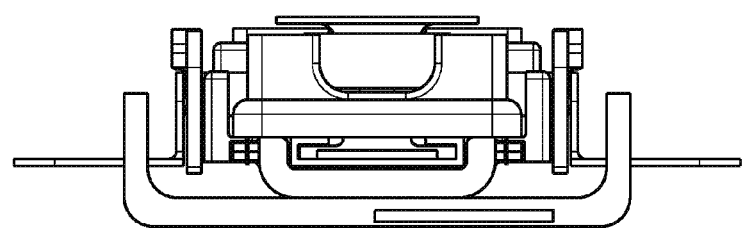
FIG. 27 depicts a rear elevation of FIG. 20, wherein the mechanism in a locked position is a mirror image of FIG. 27, and therefore is not depicted.
Figure 28:
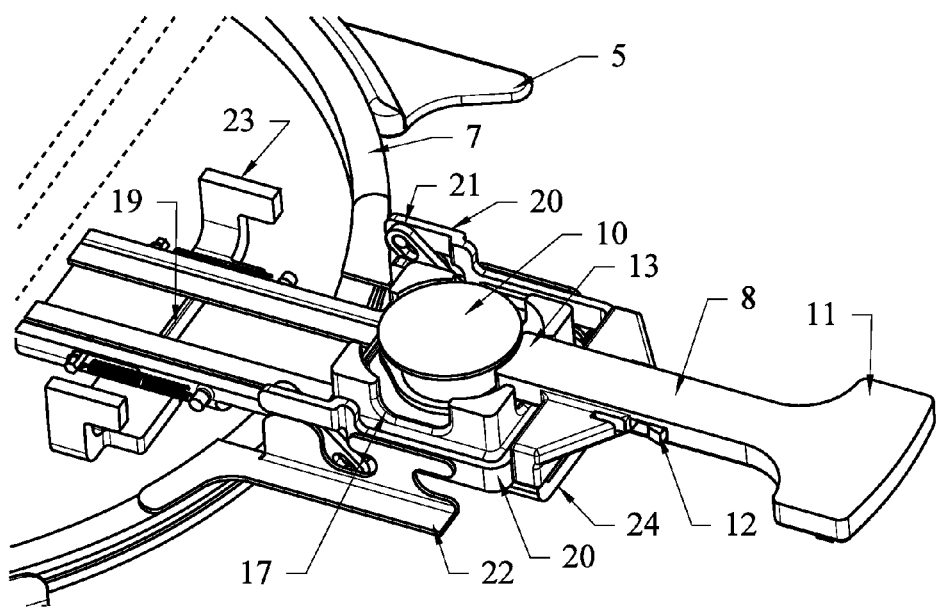
FIG. 28 depicts a top perspective view of the actuating mechanism in a locked position.
Figure 29:
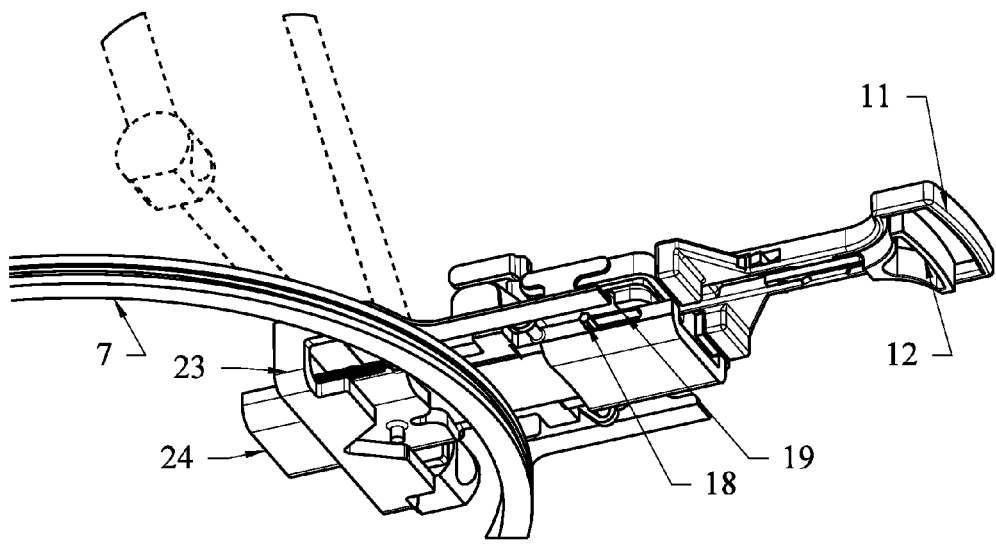
FIG. 29 depicts a bottom perspective view of FIG. 28.
Figure 30:
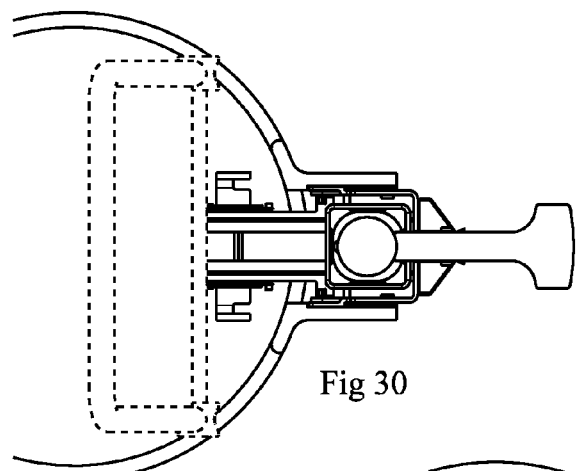
FIG. 30 depicts a top plan view of FIG. 28.
Figure 31:
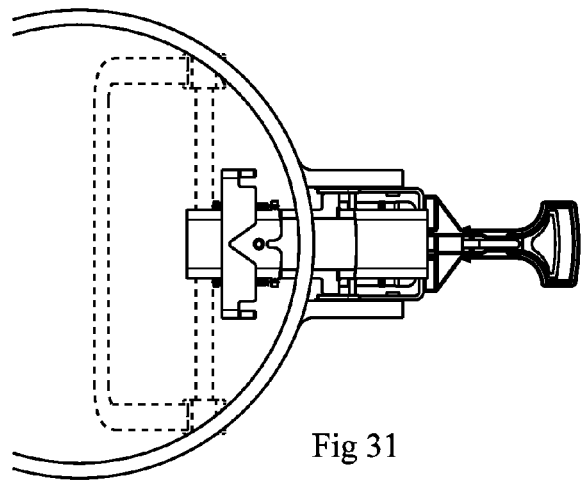
FIG. 31 depicts a bottom plan view of FIG. 28.
Figure 32:
FIG. 32 depicts a right side elevation of FIG. 28.
Figure 33:
FIG. 33 depicts a left side elevation of FIG. 28.
Figure 34:
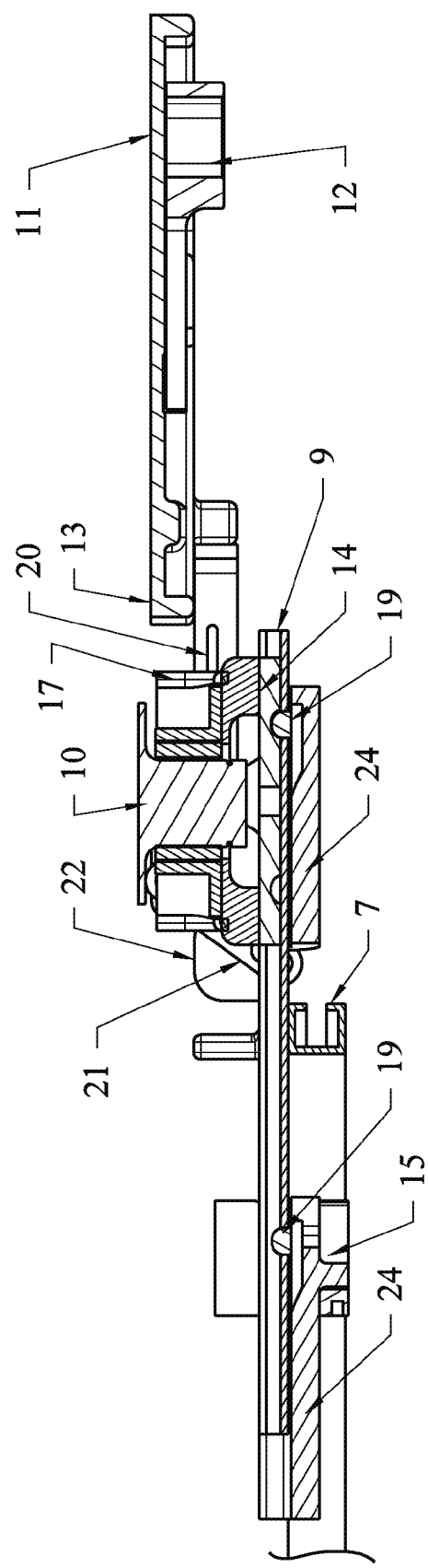
FIG. 34 depicts a cross-section of FIG. 20.
Figure 35:
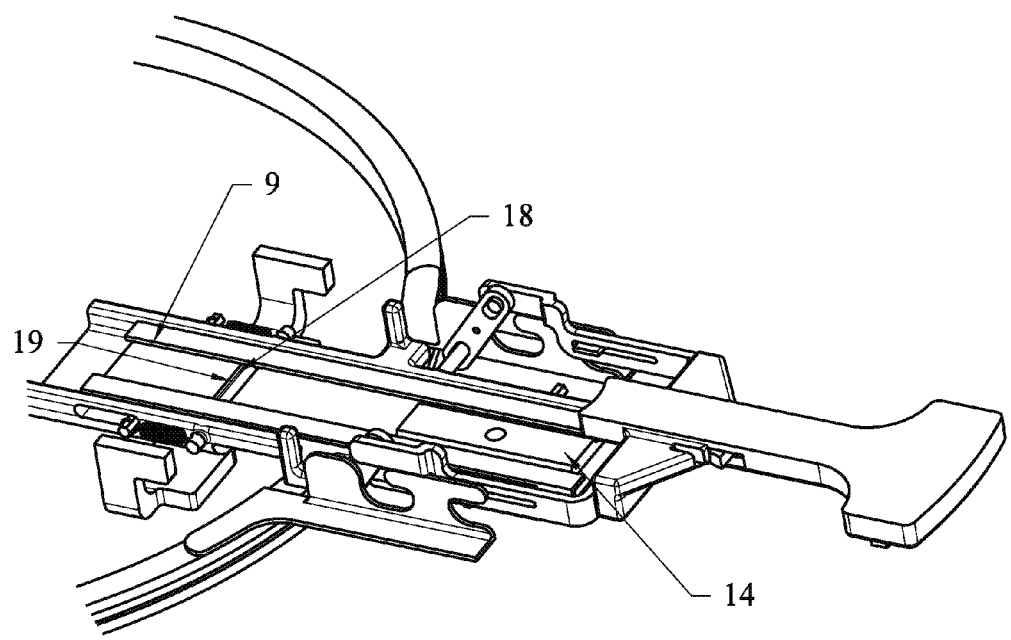
FIG. 35 depicts the sliding means of FIG. 20.
Figure 36:
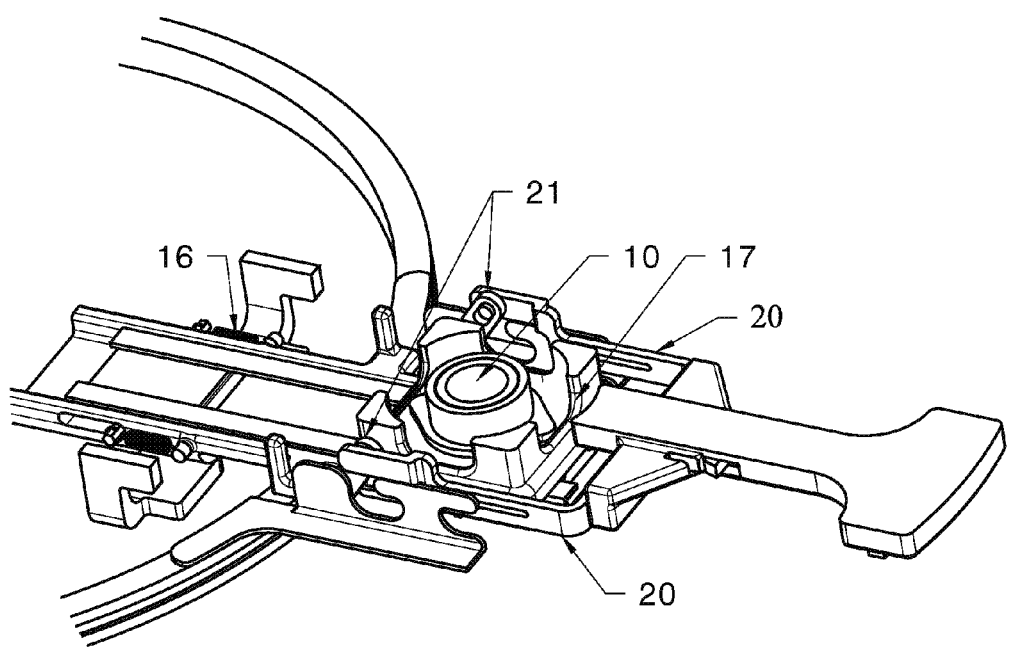
FIG. 36 depicts the pivoting means of FIG. 20.
Figure 37:
FIG. 37 depicts a perspective view of the invention, with the seats in a left facing, tandem arrangement.
Figure 38:
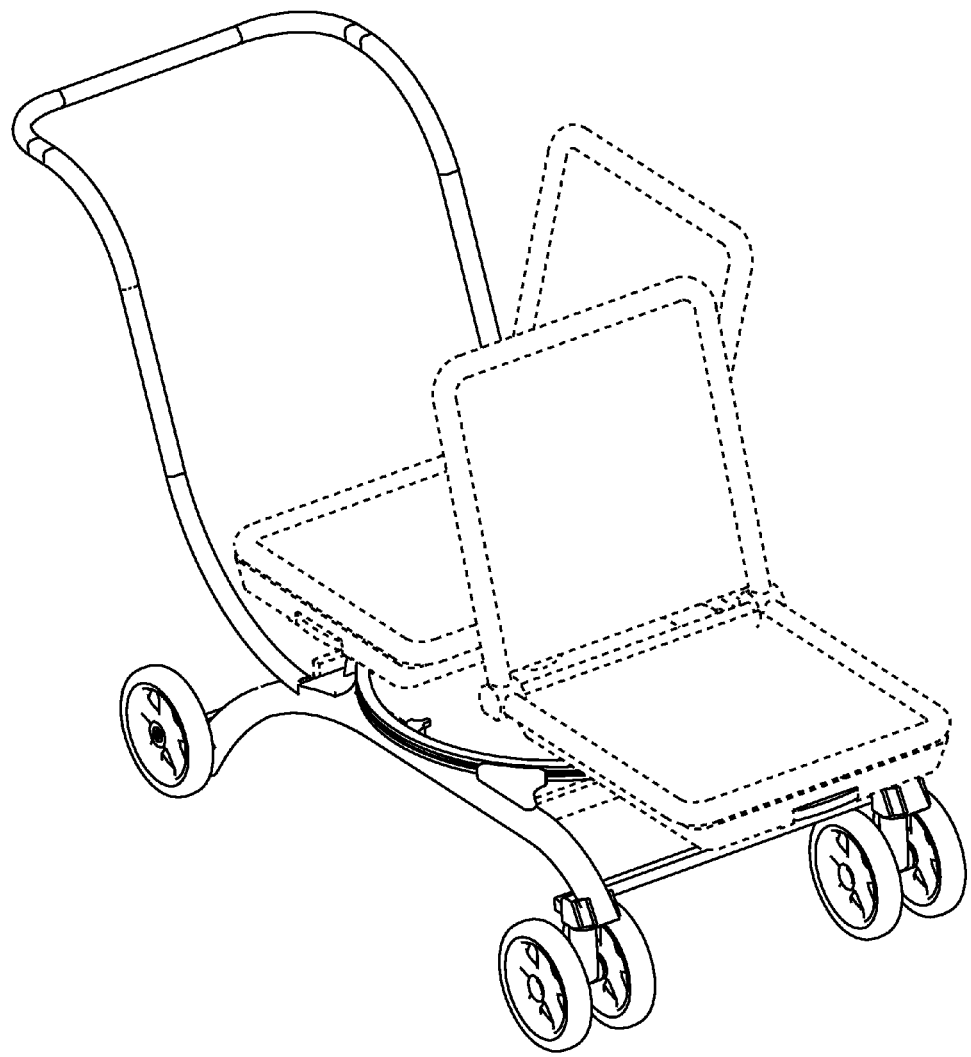
FIG. 38 depicts a perspective view of the invention, with a first seat forward facing and a second seat right facing in tandem arrangement.
Figure 39:
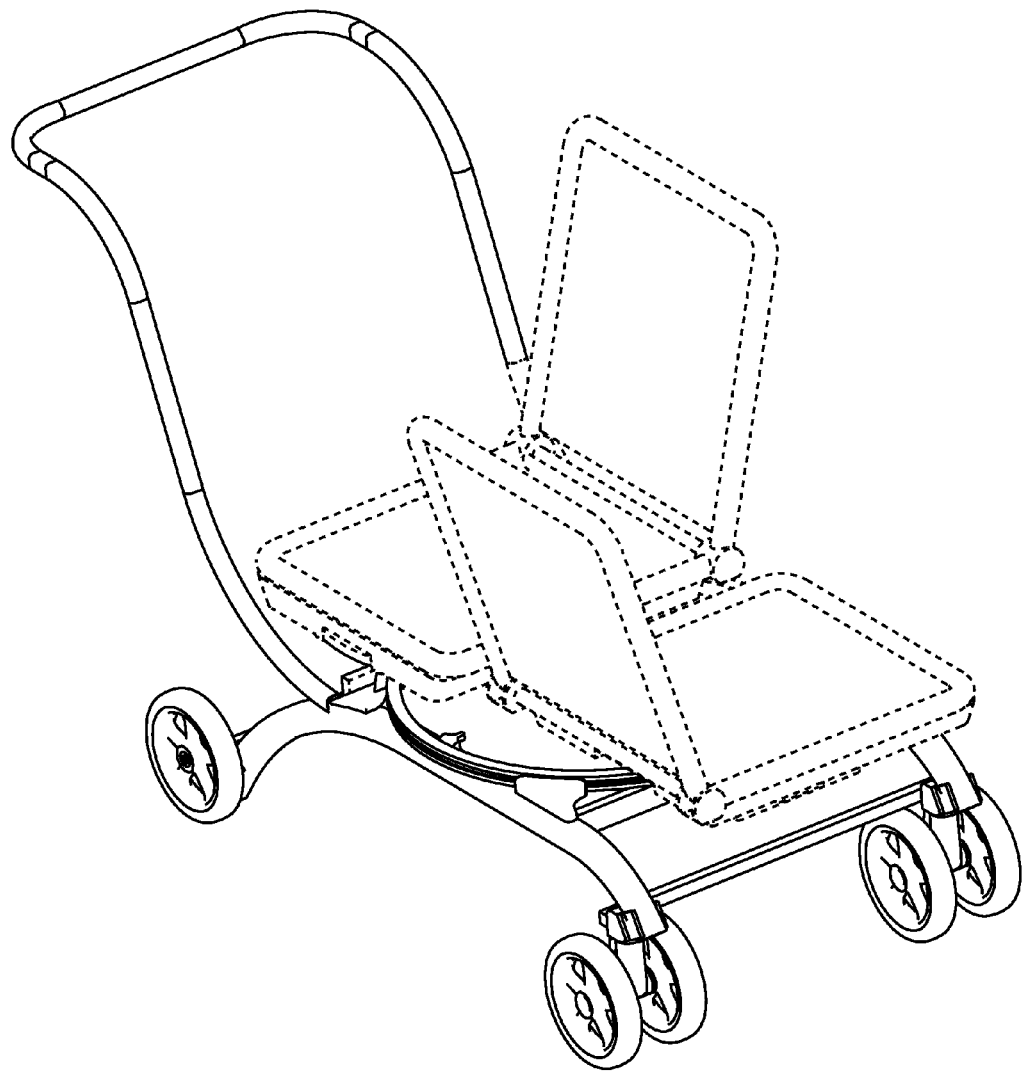
FIG. 39 depicts a perspective view of the invention, with a first seat left facing and a second seat right facing in tandem arrangement.
Figure 40:
FIG. 40 depicts a perspective view of the invention, with a first seat left facing and a second seat forward facing in a lateral arrangement.

The broken lines shown in the drawings are for illustrative purposes only, and do not form part of the present invention.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

For the sake of simplicity and to give the claims of this patent application the broadest interpretation and construction possible, the following definitions will apply:

The term "vehicle" essentially includes (without limitation) golf carts, all-terrain vehicles ("ATVs"), utility vehicles, pleasure, recreational and sporting boats, strollers, any Z-shaped vehicle including (without limitation) watercraft, aircraft and other land vehicles.

The term "double stroller" or "stroller" essentially means a stroller or baby carriage capable of supporting one or more seats for transporting one or more occupants. The term does not limit the size of the stroller's frame itself, in that the frame may be a standard single frame, an oversized frame, a standard double frame or a multi-seat stroller frame, regardless of tandem or lateral seating arrangements. The "standard" refers to whatever is commonly known and available.

The term "tandem" or derivatives thereof essentially means a longitudinal arrangement, wherein a pair of seats is arranged one in front of the other, regardless of the direction either seat faces.

The term "side-by-side" or "lateral" or derivatives thereof essentially means a sidelong arrangement of a pair of seats, each situated beside the other, regardless of the direction either seat faces.

The term "distal" essentially means the location farthest away from the reference.

The term "positioning" essentially means the pivoting, sliding and/or revolving movements of a seat; a seat's facing configuration; and/or tandem or lateral arrangement of the seats.

The term "configuration" essentially means the direction a seat is facing, such as forward facing, rearward facing, left facing, right facing or facing at an angle, regardless of a tandem or lateral arrangement.

The term "actuated" or "disengaged" or "unlocked" position or derivatives thereof essentially means that the actuating mechanism has been separated from a pivoting means, a sliding means and a revolving means, such that the seat is available for removal, pivoting, sliding and/or revolving.

The term "locked" or "engaged" position or derivatives thereof essentially means that the actuating mechanism is interconnected with a pivoting means, a sliding means and a revolving means, such that the seat is not available for removal, pivoting, sliding and/or revolving. The term "actuating mechanism" essentially means a mechanism capable of being actuated or locked with a single handle. It should be noted that the mechanism is biased in the locked position. References to the mechanism as actuated or locked essentially means that each pivoting means, sliding means and revolving means is also actuated or locked. Actuating the pivoting means, sliding means and revolving means occurs simultaneously; however, for clarity, each means will be discussed in turn.

The term "outwardly" or derivatives thereof essentially means moving away from the center of the ring and the frame.

The term "inwardly" or derivatives thereof essentially means moving toward the center of the ring and the frame.

The term "forward facing" essentially means the seat faces the front of the vehicle or stroller.

The term "rearward facing" essentially means the seat faces the rear of the vehicle or stroller.

The term "outwardly facing" essentially means the seats face in opposite directions, with the back of each seat adjacent to the other seat.

The term "inwardly facing" essentially means the seats face each other.

The term "plastic" material includes, but is not limited to, polypropylene, polyethylene, thermoplastics and any other combination and mixture thereof.

Also for the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The invention disclosed herein is not limited by construction materials to the extent that such materials satisfy the structural and/or functional requirements. Any material may be used so long as it satisfies the function for which it is being used, for example, using aluminum or a comparable durable material for the frame and a plastic or fabric material for the seat.

The invention is an apparatus for controlling the positioning of one or more of the seats (1) for a vehicle (2), the apparatus comprising (including or having) a frame (3) anchored to the vehicle (2), the frame (3) having a plurality of stop members (4) and supporting a ring carriage (5); a ring (7) revolvably captured within the ring carriage (5); and an actuating mechanism (the "mechanism") (6) beneath the seat (1), the mechanism comprising: a pivoting means for pivoting the seat (1), a sliding means for sliding the seat (1) and a revolving means for revolving the seat (1), along with the ring, around the frame (3). The mechanism (6) comprises a handle (8), and a support housing for supporting the mechanism on the frame (3), for housing the sliding means, and for supporting the pivoting means and the revolving means. In one embodiment, the vehicle is a double stroller (2).

The frame (3) is anchored, permanently or temporarily, to the vehicle (2) and supports the seat (1). The plurality of stop members (4) secures the seat (1) to the ring (7) and the frame (3) when the mechanism is locked. Each stop member (4) may be spaced apart equally around the frame (3) or in any other spacing. It should be noted that the number of stop members (4) is not limited to the four as depicted in the figures. To secure the seat (1) to the frame (3), a stop member (4) engages with the mechanism's stop member receiver (15). Thus, whenever the mechanism is locked, the seat (1) is prohibited from pivoting, sliding and revolving.

One or more seats may be used in this invention. Each seat (1) is removably connected to the ring (7) via the mechanism (6) and may be positioned around the frame (3) at any available location that has a stop member (4). When more than one seat is used, a second seat may be placed on the frame (3) to create a tandem arrangement or lateral arrangement. For the seats to revolve, each seat's respective mechanism must be disengaged from each stop member (4) so that the ring (and the seats) may revolve around the frame (3). Since each seat (1) is independently pivotable on its pivot point (10), the mechanism facilitates the seat facing configuration selected from the group consisting of:

1. Tandem, both seats forward facing;
2. Tandem, both seats rearward facing;
3. Tandem, both seats inward facing;
4. Tandem, both seats outward facing;
5. Tandem, first seat forward facing, second seat right facing;
6. Tandem, first seat forward facing, second seat left facing;
7. Tandem, first seat rearward facing, second seat right facing;
8. Tandem, first seat rearward facing, second seat left facing;
9. Tandem, both seats left facing;
10. Tandem, first seat left facing, second seat forward facing;
11. Tandem, first seat left facing, second seat rearward facing;
12. Tandem, first seat left facing, second seat right facing;
13. Tandem, both seats right facing;
14. Tandem, first seat right facing, second seat forward facing;
15. Tandem, first seat right facing, second seat rearward facing;
16. Tandem, first seat right facing, second seat left facing;
17. Lateral, both seats forward facing;
18. Lateral, both seats rearward facing;
19. Lateral, first seat forward facing, second seat rearward facing;
20. Lateral, first seat forward facing, second seat left facing;
21. Lateral, first seat forward facing, second seat right facing;
22. Lateral, first seat rearward facing, second seat forward facing;
23. Lateral, first seat rearward facing, second seat left facing;
24. Lateral, first seat rearward facing, second seat right facing;
25. Lateral, both seats left facing;

26. Lateral, first seat left facing, second seat forward facing;

27. Lateral, first seat left facing, second seat rearward facing;

28. Lateral, first seat left facing, second seat right facing;

29. Lateral, both seats right facing;

30. Lateral, first seat right facing, second seat forward facing;

31. Lateral, first seat right facing, second seat rearward facing;

32. Lateral, first seat right facing, second seat left facing; and

33. Combinations thereof.

It should be noted that the above configurations are not limited to those disclosed. For example, the seat (1) may be pivoted to forward facing at a 30° angle. Moreover, each seat (1) is independently slidable outwardly and inwardly, regardless of the seating configuration or the tandem arrangement or lateral arrangement.

The handle (8) actuates the mechanism (6) and guides the seat's (1) pivoting, sliding and revolving. It comprises a handgrip (11), a depressible lock (12) and a distal end (13). In one embodiment, the distal end (13) slides into one of the locking slots (17) to prevent pivoting.

The support housing comprises an elongated casing (9) for housing the sliding means for sliding the seat (1) outwardly and inwardly, and for supporting the pivoting means and revolving means. The casing (9) comprises a longitudinal edge and a plurality of sliding slots (19) for receiving at least one sliding pin (18). The support housing further comprises a slidable base (24) for sliding along the edge of the casing (9). The base (24) comprises at least one stop member receiver (15) for receiving one of the corresponding stop members (4) and a valley for removably connecting the mechanism to the ring (7), and consequently to the frame (3). For the lateral arrangement, the mechanism further comprises a lateral stop member receiver (23) for receiving one of the stop members (4), rather than base's (24) stop member receiver (15).

The ring (7) is revolvably and impermanently captured within the ring carriage (5). In this situation, the seats (with the respective mechanisms) and the ring (7) are capable of revolving around the frame (3), clockwise or counterclockwise. Alternatively, the ring (7) may be permanently captured with the ring carriage (5), such that only the seat is capable of revolving around the frame (3). When the mechanism is engaged, the ring (7) is locked into place and is no longer revolvable. It should be noted that if more than one seat is installed, each seat's mechanism must be actuated so that the ring (7) (and the two seats) can revolve freely around the frame (3). If only one seat (1) is actuated, then that respective seat is only capable of pivoting on its pivot point (10), and sliding outwardly and inwardly. Thus, to convert double seats from a tandem arrangement to a lateral arrangement or vice versa, one must first actuate each seat's mechanism, revolve the seats to the desired arrangement, and finally lock at least one mechanism.

The mechanism (6) further comprises a locking assembly that facilitates unlocking and locking the pivoting means, the sliding means and the revolving means. The locking assembly includes, but not limited to, gear-sets, rocker arms, spring-biased assemblies and any other comparable assembly or combinations thereof. In one embodiment where the locking assembly is a spring-biased assembly, the locking assembly comprises a support bracket (22), a primary linkage (20), a secondary linkage (21), a spring (16), and the slidable base (24). On each side of the base (24) are a pair of prongs, with one end for connecting with the biased spring (16) and the opposite end for connecting with the secondary linkage (21). Here, the casing also has a pair of prongs for connecting with the biased spring (16). The support bracket (22) is an additional support for the mechanism, and is also employed as axle for the secondary linkage (21). The primary linkage (20) is connected to the secondary linkage (21), abuts the handle (8), and shifts forward when the mechanism is actuated, and rearward when the mechanism is locked. The secondary linkage (21) pivots clockwise about its axle as the mechanism is actuated, and has two bores for connecting with the primary linkage (20) and the slidable base (24).

When locked, the spring (16) compresses such that the base (24) and the casing (9) are in close proximity to each other. The spring (16) extends when the mechanism is actuated as the base (24) slides along the edge of the casing (9) to its predetermined limit. When the base (24) slides, the handle (8) and primary linkage (20) simultaneously shift forward and away from the mechanism, and the secondary linkage (21) pivots clockwise.

Figure 41:
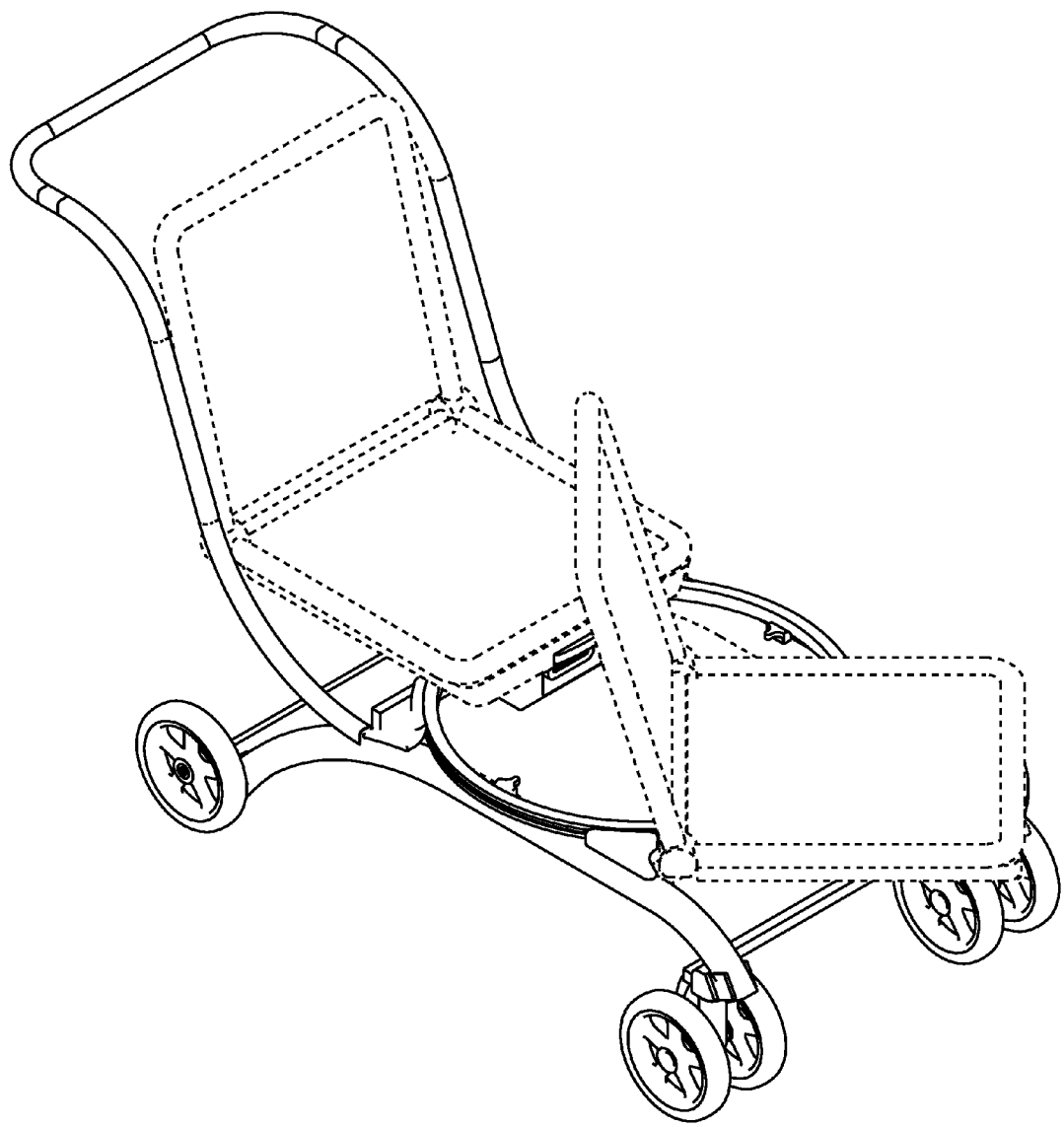
FIG. 41 depicts a perspective view of the invention, with a first seat forward facing at an angle and a second seat forward facing in tandem arrangement.

The pivoting means comprises a pivot point (10) beneath the seat (1), and a plurality of locking slots (17) for locking the pivoting means, and the handle (8). When the pivoting means is actuated, the seat (1) is free to pivot 360°, and will continue to pivot until the pivoting means is locked. The locking slots (17) may include any component that is capable of receiving the distal end of the handle (13) to prevent the seating's pivoting. In one embodiment, the plurality of locking slots (17) surrounds the pivot point (10), with each locking slot (17) sized to receive the distal end (13) of the handle (8). Once the desired pivoting has been reached, the handle (8) is pushed into one of the locking slots (17), and the pivoting means is locked. The pivoting means allows for facing the seat in a desired direction, such as forward facing, rearward facing, left facing, right facing or facing at an angle. FIG. 41 depicts one embodiment where one seat (1) is pivoted at an angle.

The sliding means comprises a slidable slide traveler (14) for travelling within the support housing's casing (9), at least one sliding pin (18), at least one sliding slot (19) from the casing (9), and the handle (8) for guiding the seat's (1) sliding. The slide traveler (14) is beneath the pivoting means and has at least one aperture that corresponds to the sliding slots (19). In one embodiment, the distance the slide traveler (14) may travel within the casing (9) is 9 inches or 23 cm. Once the desired sliding position has been reached, the mechanism is locked and a sliding pin (18) slides into one of the sliding slots (19), thereby preventing the slide traveler (14) from travelling. The sliding means allows for proper spacing of stroller occupants, such as accommodating leg room for the occupant.

The revolving means comprises the ring (7) revolving, along with the seat (1), around the frame (3), at least one stop member receiver (15) for receiving and one of the stop members (4), and the base that removably connects the mechanism to the ring. When actuated, the stop member (4) and the stop member receiver (15) are separated such that the ring (7) (along with the seat) is free to revolve around the frame (3). In contrast, when the mechanism is locked, the stop member receiver (15) receives the stop member (4) to prevent the seat (1) from revolving.

When the seats are in a lateral arrangement, however, the stop member (4) engages with the lateral stop member receiver (23). It should be noted that the pivoting means and sliding means function substantially in the same manner for the lateral arrangement as in the above disclosure for the tandem arrangement or single seat arrangement.

A method of controlling the positioning of one or more of the seats (1) for a vehicle, such as a double stroller (2), involves an apparatus having a frame (3) anchored to the vehicle, the frame (3) having a plurality of stop members (4) and supporting a ring carriage (5); a ring (7) revolvably captured within the ring carriage (5); and an actuating mechanism beneath the seat (1). The mechanism comprises a handle; (8) and a support housing for supporting the mechanism over the ring (7), for housing a sliding means, and for supporting a pivoting means and a revolving means. The method comprises the steps of:

a. actuating the mechanism (6) by pulling the handle (8) having a handgrip (11) and pressing the handle's depressible lock (12) to simultaneously actuate the pivoting means, the sliding means and the revolving means;

b. pivoting the seat (1) clockwise or counterclockwise about a pivot point (10) beneath the seat (1);

c. sliding the seat (1) outwardly and inwardly on a slidable slide traveler (14) for travelling within the support housing having an elongated casing (9);

d. revolving the ring (7), along with the seat (1), around the frame (3) to one of the stop members (4); and e. locking the mechanism by pushing the distal end (13) of the handle (8) into the pivoting means further comprising a locking assembly lock the seat's (1) pivoting, engaging the slide traveler (14) further comprising a sliding pin (18) with the casing (9) having a plurality of sliding slots (19) to lock the seat's (1) sliding, and engaging the support housing having a slidable base (24) comprising at least one stop member receiver (15) for receiving one of the stop members (4) to lock the seat's (1) revolving. In one embodiment, the locking assembly includes a spring-biased assembly having a plurality of locking slots which receive the distal end of the handle. When actuated, the seat (1) may be removed, pivoted, slid, revolved or arranged in a tandem or lateral arrangement. The method used here applies equally for obtaining a tandem arrangement or a lateral arrangement.

The method of converting the apparatus from one seat to two seats, regardless of tandem or lateral arrangement, comprises the steps of installing the seat (1) with the mechanism (6) over the ring (7) so that the slidable base's (24) valley sits over the ring (7); adjusting the seat's (1) pivoting, sliding and revolving; and locking the mechanism back into place. When in a double seat configuration, the method of converting the positioning of the seats from a tandem arrangement to a lateral arrangement or vice versa begins by actuating each seat's (1) mechanism, revolving the ring (7) (along with the seats) around the frame (3) to a desired position, and locking at least one mechanism to one of the stop members (4).

In a tandem arrangement, the mechanism may be used to facilitate the seat facing configuration selected from the group consisting of: both seats forward facing; both seats rearward facing; both seats inward facing; both seats outward facing; first seat forward facing, second seat right facing; first seat forward facing, second seat left facing; first seat rearward facing, second seat right facing; first seat rearward facing, second seat left facing; both seats left facing; first seat left facing, second seat forward facing; first seat left facing, second seat rearward facing; first seat left facing, second seat right facing; both seats right facing; first seat right facing, second seat forward facing; first seat right facing, second seat rearward facing; and first seat right facing, second seat left facing.

In a lateral arrangement, the mechanism may be used to facilitate the seat facing configuration selected from the group consisting of: both seats forward facing; both seats rearward facing; first seat forward facing, second seat rearward facing; first seat forward facing, second seat left facing; first seat forward facing, second seat right facing; first seat rearward facing, second seat forward facing; first seat rearward facing, second seat left facing; first seat rearward facing, second seat right facing; both seats left facing; first seat left facing, second seat forward facing; first seat left facing, second seat rearward facing; first seat left facing, second seat right facing; both seats right facing; first seat right facing, second seat forward facing; first seat right facing, second seat rearward facing; and first seat right facing, second seat left facing.

Although a double stroller is disclosed, the same invention would be applicable for a multi-seat stroller, such as a stroller for transporting three occupants.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. An apparatus for controlling the positioning of one or more seats for a vehicle, said apparatus comprising a frame anchored to the vehicle, said frame having a plurality of stop members and supporting a ring carriage; a ring revolvably captured within said ring carriage; and an actuating mechanism beneath the seat, said mechanism comprising: a pivoting means for pivoting the seat, a sliding means for sliding the seat, a revolving means for revolving the seat around said frame, a handle for actuating said mechanism and for guiding the seat's pivoting, sliding and revolving, and a support housing for supporting the mechanism over the ring, for housing said sliding means, and for supporting said pivoting means and said revolving means.

2. The apparatus of claim 1, said handle comprising a handgrip; a depressible lock and a distal end for engaging with said pivoting means.

3. The apparatus of claim 1, said support housing comprising an elongated casing for housing said sliding means, said sliding means for sliding the seat outwardly and inwardly, and for supporting said pivoting means comprising a pivot point, said casing having a longitudinal edge and having a plurality of sliding slots for receiving at least one sliding pin; and a slidable base for sliding along the edge of said casing, said base having at least one stop member receiver for receiving one of said stop members and having a valley for removably connecting said mechanism to said ring.

4. The apparatus of claim 3, said sliding means comprising a slidable slide traveler for travelling within said casing.

5. The apparatus of claim 3, said mechanism further comprising a locking assembly for actuating said pivoting means, sliding means and revolving means.

6. The apparatus of claim 5, said locking assembly selected from the group consisting of a spring-biased assembly, a gear-set assembly, rocker arms assembly and combinations thereof.

7. The apparatus of claim 5, said locking assembly comprising a spring-biased assembly, and a plurality of locking slots for engaging with the distal end of said handle to lock the pivoting of the seat.

8. The apparatus of claim 3, said revolving means comprising said ring revolving, along with the seat, around said frame; at least one of said stop member receivers for receiving one of said stop members; and said base removably connecting said mechanism to said ring.

9. The apparatus of claim 1, said mechanism further comprising a lateral stop member receiver for receiving one of said stop members when the seats are in a lateral arrangement.

10. The apparatus of claim 1, said mechanism facilitating the configuration of the facing of at least one seat selected from the group consisting of both seats forward facing; both seats rearward facing; both seats inward facing; both seats outward facing; both seats left facing; both seats right facing; first seat forward, second seat right facing; first seat forward, second seat left facing; first seat rearward, second seat right facing; first seat rearward, second seat left facing; first seat left facing, second seat forward facing; first seat left facing, second seat rearward facing; first seat left facing, second seat right facing; first seat right facing, second seat forward facing; first seat right facing, second seat rearward facing; first seat right facing, second seat left facing; and combinations thereof.

11. The apparatus of claim 1, the positioning of the seats including at least two seats in tandem arrangement, said mechanism facilitating the configuration of the facings of the two seats selected from the group consisting of both seats forward facing; both seats rearward facing; both seats inward facing; both seats outward facing; both seats left facing; both seats right facing; first seat forward, second seat right facing; first seat forward, second seat left facing; first seat rearward, second seat right facing; first seat rearward, second seat left facing; first seat left facing, second seat forward facing; first seat left facing, second seat rearward facing; first seat left facing, second seat right facing; first seat right facing, second seat forward facing; first seat right facing, second seat rearward facing; first seat right facing, second seat left facing; and combinations thereof.

12. The apparatus of claim 1, the positioning of the seats including at least two seats in lateral arrangement, said mechanism facilitating the configuration of the facing of the two seats selected from the group consisting of both seats forward facing; both seats rearward facing; first seat forward facing, second seat rearward facing; first seat forward facing, second seat left facing; first seat forward facing, second seat right facing; first seat rearward facing, second seat forward facing; first seat rearward facing, second seat left facing; first seat rearward facing, second seat right facing; both seats left facing; first seat left facing, second seat forward facing; first seat left facing, second seat rearward facing; first seat left facing, second seat right facing; both seats right facing; first seat right facing, second seat forward facing; first seat right facing, second seat rearward facing; and first seat right facing, second seat left facing.

13. An apparatus for controlling the positioning of one or more seats for a stroller, said apparatus comprising a frame anchored to the stroller, said frame having a plurality of stop members and supporting a ring carriage; a ring revolvably captured within said ring carriage; and an actuating mechanism beneath the seat, said mechanism comprising: a handle having a handgrip, a depressible lock, and a distal end; and a support housing for supporting the mechanism over the ring, for housing a sliding means for sliding the seat outwardly and inwardly, and for supporting a revolving means for revolving the seat, along with said ring, around said frame and a pivoting means having a pivot point for pivoting the seat; said support housing comprising an elongated casing for housing said sliding means, said casing having a longitudinal edge and having a plurality of sliding slots for receiving at least one sliding pin; and a slidable base for sliding along the edge of said casing, said base having at least one stop member receiver for receiving one of said stop members and having a valley for removably connecting said mechanism to said ring.

14. The apparatus of claim 13, said sliding means comprising a slidable slide traveler for travelling within said casing; at least one said sliding pin; and a plurality of said sliding slots.

15. The apparatus of claim 13, said pivoting means further comprising a spring-biased locking assembly, a plurality of locking slots and the distal end of said handle for locking said pivoting means.

16. The method of controlling the positioning of one or more of seats for a vehicle using an apparatus having a frame anchored to the vehicle, said frame having a plurality of stop members and supporting a ring carriage; a ring revolvably captured within said ring carriage; and an actuating mechanism beneath the seat, said mechanism comprising: a handle having a handgrip, a depressible lock and a distal end; and a support housing having an elongated casing for housing said sliding means for sliding the seat outwardly and inwardly, for supporting a revolving means for revolving the seat, along with said ring, around said frame and a pivoting means having a pivot point for pivoting the seat, said method comprising the steps of:
  a. actuating said mechanism by pulling and pressing said handle's depressible lock to actuate said pivoting means, sliding means and revolving means;
  b. pivoting the seat about said pivot point beneath the seat;
  c. sliding the seat outwardly and inwardly on a slidable slide traveler for travelling within said casing;
  d. revolving the seat, along with said ring, around said frame to one of said stop members; and
  e. locking said mechanism by pushing said handle's distal end into said pivoting means further comprising a locking assembly to lock the seat's pivoting, engaging said sliding means further comprising a sliding pin with said casing having a plurality of sliding slots to lock the seat's sliding, and engaging said support housing having a slidable base comprising at least one stop member receiver for receiving said stop member to lock the seat's revolving.

17. The method of claim 16, the positioning of the seats including at least two seats, the step further comprising converting the seats from a tandem arrangement to a lateral arrangement by actuating each seat's said mechanism, revolving said ring and the seats around the frame, and locking said mechanism to one of the said stop members.

18. The method of claim 17, the positioning of the seats including at least two seats in a tandem arrangement, the step further comprising using said mechanism to facilitate the configuration of the facings of the two seats selected from the group consisting of both seats forward facing; both seats rearward facing; both seats inward facing; both seats outward facing; both seats left facing; both seats right facing; first seat forward, second seat right facing; first seat forward, second seat left facing; first seat rearward, second seat right facing; first seat rearward, second seat left facing; first seat left facing, second seat forward facing; first seat left facing, second seat rearward facing; first seat left facing, second seat right facing; first seat right facing, second seat forward facing; first seat right facing, second seat rearward facing; first seat right facing, second seat left facing; and combinations thereof.

19. The method of claim 17, the positioning of the seats including at least two seats in a lateral arrangement, the step further comprising using said mechanism to facilitate the two seats facing configuration selected from the group consisting of both seats forward facing; both seats rearward facing; first seat forward facing, second seat rearward facing; first seat forward facing, second seat left facing; first seat forward facing, second seat right facing; first seat rearward facing, second seat forward facing; first seat rearward facing, second seat left facing; first seat rearward facing, second seat right facing; both seats left facing; first seat left facing, second seat forward facing; first seat left facing, second seat rearward facing; first seat left facing, second seat right facing; both seats right facing; first seat right facing, second seat forward facing; first seat right facing, second seat rearward facing; and first seat right facing, second seat left facing.

* * * * *